(12) United States Patent
Albrecht et al.

(10) Patent No.: US 9,953,684 B2
(45) Date of Patent: *Apr. 24, 2018

(54) ADHESIVE COVER SEAL FOR HERMETICALLY-SEALED DATA STORAGE DEVICE

(71) Applicant: HGST Netherlands B.V., Amsterdam (NL)

(72) Inventors: Thomas R. Albrecht, San Jose, CA (US); Darya Amin-Shahidi, San Jose, CA (US); Toshiki Hirano, San Jose, CA (US); Kirk B. Price, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/169,018

(22) Filed: May 31, 2016

(65) Prior Publication Data
US 2017/0053680 A1    Feb. 23, 2017

Related U.S. Application Data

(60) Provisional application No. 62/207,888, filed on Aug. 20, 2015.

(51) Int. Cl.
    *C03C 15/00*      (2006.01)
    *C03C 25/68*      (2006.01)
    (Continued)

(52) U.S. Cl.
    CPC .......... *G11B 33/027* (2013.01); *G11B 25/043* (2013.01); *G11B 33/148* (2013.01);
    (Continued)

(58) Field of Classification Search
None
See application file for complete search history.

(56) References Cited

U.S. PATENT DOCUMENTS 4,624,752 A * 11/1986 Arrowsmith .......... C25D 11/24
    156/151
5,084,123 A     1/1992 Curtis
(Continued)

OTHER PUBLICATIONS

Thomas R. Albrecht et al., Adhesive Cover Seal for Hermetically-Sealed Data Storage Device, U.S. Appl. No. 15/168,766, filed May 31, 2016, filed by same Applicant/Assignee on same date herewith.
(Continued)

*Primary Examiner* — Stephanie P Duclair
(74) *Attorney, Agent, or Firm* — John D. Henkhaus

(57) ABSTRACT

A method of assembling a data storage device comprises forming an enclosure by overlapping each of a plurality of sidewalls of a cover with a corresponding sidewall of a base part, dispensing a liquid adhesive between the respective sidewalls of the cover and base part in such a quantity at each of a plurality of locations to promote capillary flow of the liquid adhesive to form a continuous film of liquid adhesive between the sidewalls, and curing the continuous film of liquid adhesive to form a hermetic seal between the cover and the base part. Embodiments may include surface treating the sidewall surface(s), which can help promote the capillary flow of the liquid adhesive. The hermetic seal provides for a lighter-than-air gas to be held therein.

23 Claims, 14 Drawing Sheets

(51) Int. Cl.
  *H01L 21/30* (2006.01)
  *H01L 21/46* (2006.01)
  *H01L 21/302* (2006.01)
  *H01L 21/461* (2006.01)
  *G11B 33/02* (2006.01)
  *G11B 33/14* (2006.01)
  *H01L 21/304* (2006.01)
  *H01L 21/20* (2006.01)
  *G11B 25/04* (2006.01)

(52) U.S. Cl.
  CPC ...... *G11B 33/1446* (2013.01); *G11B 33/1466* (2013.01); *G11B 33/1486* (2013.01); *H01L 21/2007* (2013.01); *H01L 21/304* (2013.01)

(56) References Cited

U.S. PATENT DOCUMENTS

| | | |
|---|---|---|
| 5,233,491 A | 8/1993 | Kadonaga et al. |
| 5,454,157 A | 10/1995 | Ananth et al. |
| 5,600,509 A | 2/1997 | Kawakami |
| 5,696,648 A | 12/1997 | Jeong et al. |
| 5,793,566 A | 8/1998 | Scura et al. |
| 6,226,143 B1 | 5/2001 | Stefansky |
| 6,266,207 B1 | 7/2001 | Iwahara et al. |
| 6,271,985 B1 | 8/2001 | Ishikawa |
| 6,525,899 B2 | 2/2003 | Hearn et al. |
| 6,693,767 B2 | 2/2004 | Butler |
| 6,721,128 B1 | 4/2004 | Koizumi et al. |
| 6,762,909 B2 | 7/2004 | Albrecht et al. |
| 6,820,272 B2 | 11/2004 | Wang |
| 7,119,984 B2 | 10/2006 | Macleod et al. |
| 7,218,473 B2 | 5/2007 | Bernett et al. |
| 7,362,541 B2 | 4/2008 | Bernett et al. |
| 7,522,375 B2 | 4/2009 | Tsuda et al. |
| 7,692,891 B2 | 4/2010 | Hatchett et al. |
| 7,876,528 B2 | 1/2011 | Uefune et al. |
| 7,957,092 B2 | 6/2011 | Ichikawa et al. |
| 8,094,408 B2 | 1/2012 | Uefune et al. |
| 8,205,220 B2 | 6/2012 | Kim et al. |
| 8,279,552 B2 | 10/2012 | Stipe |
| 8,451,559 B1 | 5/2013 | Berding et al. |
| 8,533,934 B2 | 9/2013 | McGuire, Jr. et al. |
| 8,659,849 B2 | 2/2014 | Hayakawa et al. |
| 8,753,093 B2 | 6/2014 | Liotta |
| 8,854,766 B1 | 10/2014 | Gustafson et al. |
| 9,147,436 B2 | 9/2015 | Watson et al. |
| 9,429,494 B1 | 8/2016 | Gustafson |
| 2003/0081348 A1 | 5/2003 | Watanabe et al. |
| 2005/0094312 A1 | 5/2005 | Sato |
| 2006/0002005 A1 | 1/2006 | Miyazaki et al. |
| 2006/0034010 A1 | 2/2006 | Abe et al. |
| 2007/0035872 A1 | 2/2007 | Hayakawa et al. |
| 2007/0171567 A1 | 7/2007 | Choi et al. |
| 2007/0177308 A1 | 8/2007 | Kimura |
| 2007/0183085 A1 | 8/2007 | Hatchett et al. |
| 2009/0241322 A1 | 10/2009 | Uefune et al. |
| 2011/0212281 A1 | 9/2011 | Jacoby et al. |
| 2012/0275287 A1* | 11/2012 | McGuire, Jr. ........ G11B 25/043 369/75.11 |
| 2014/0301043 A1 | 10/2014 | Onishi et al. |
| 2016/0376473 A1 | 12/2016 | Furuta et al. |

OTHER PUBLICATIONS

Thomas R. Albrecht et al., Adhesive Cover Seal for Hermetically-Sealed Data Storage Device, U.S. Appl. No. 15/168,895, filed May 31, 2016, filed by same Applicant/Assignee on same date herewith.
Anonymous, Top cover sealing structure, The IP.com Prior Art Database, Jan. 23, 2014, 4 pages, IPCOM000234620D, ip.com, downloaded from https://priorart.ip.com/IPCOM/000234620.
S. Fujio et al., Hard Disk Drive Enclosure Sealing for Electromagnetic Noise Immunity, IP.com Prior Art Database, Original Publication Date: Jun. 1, 1994 in IBM Technical Disclosure Bulletin vol. 37 No. 06A, Included in the Prior Art Database: Mar. 27, 2005, IP.com Disclosure No. IPCOM000112786D, IBM, US.

\* cited by examiner

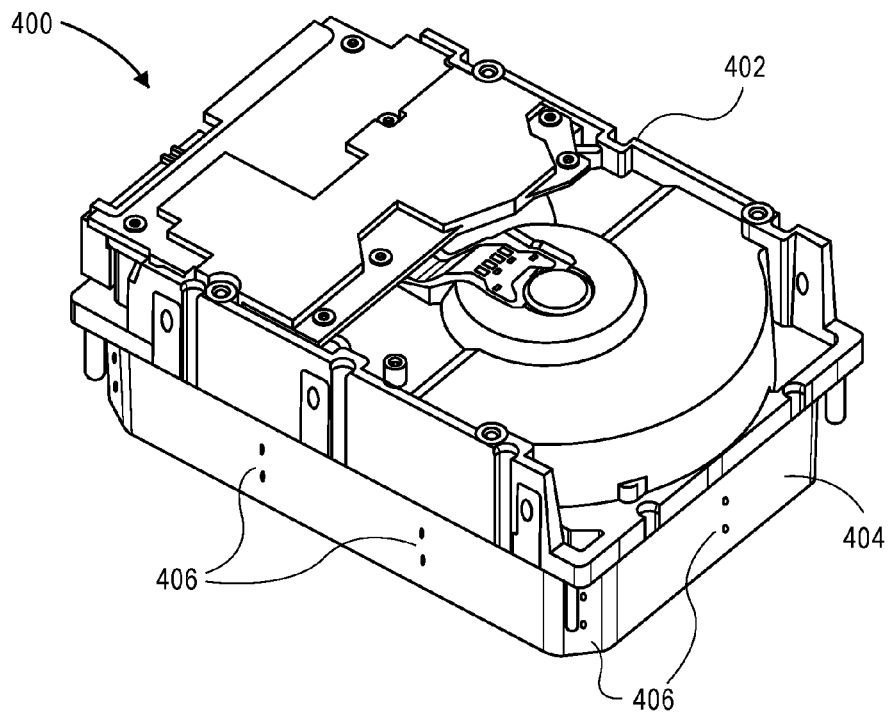
FIG. 4
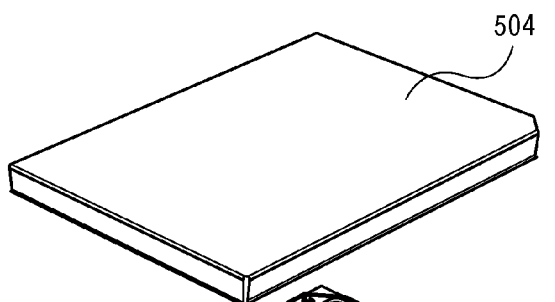
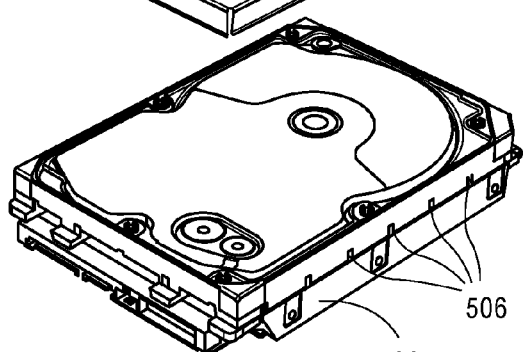
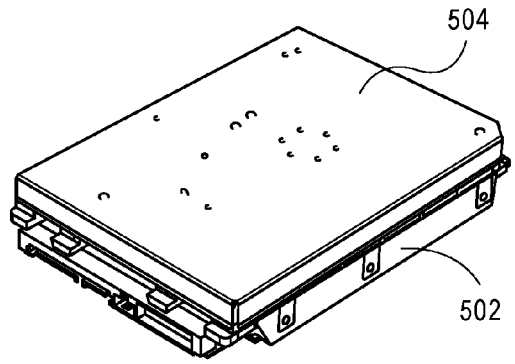
FIG. 5A      FIG. 5B

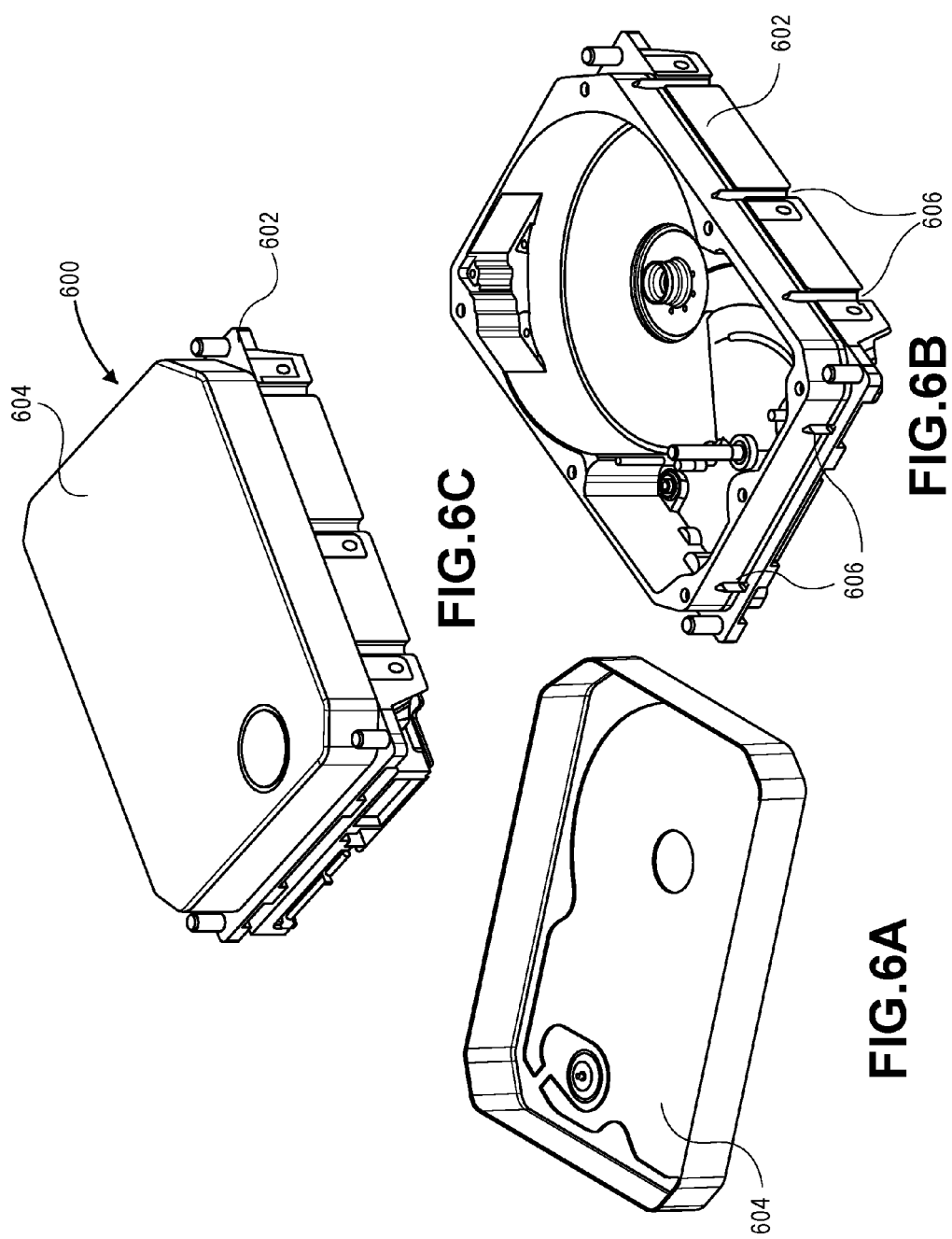

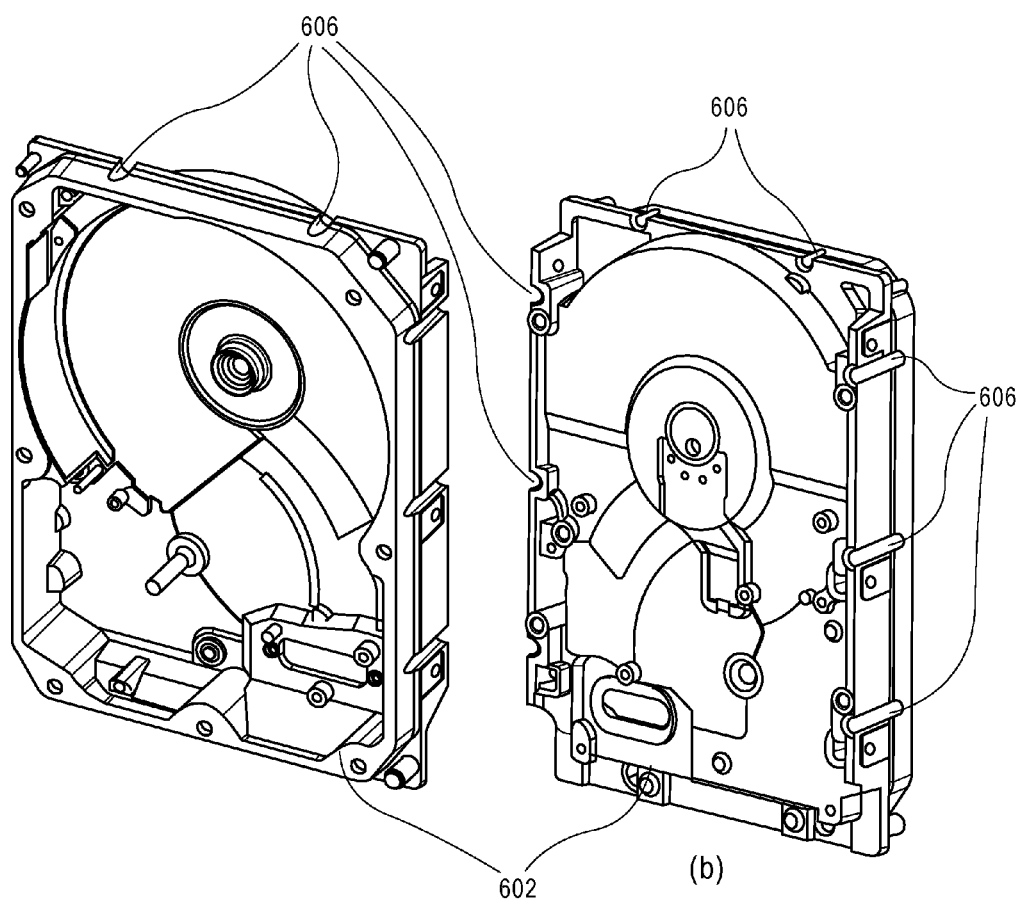
FIG. 7A     FIG. 7B

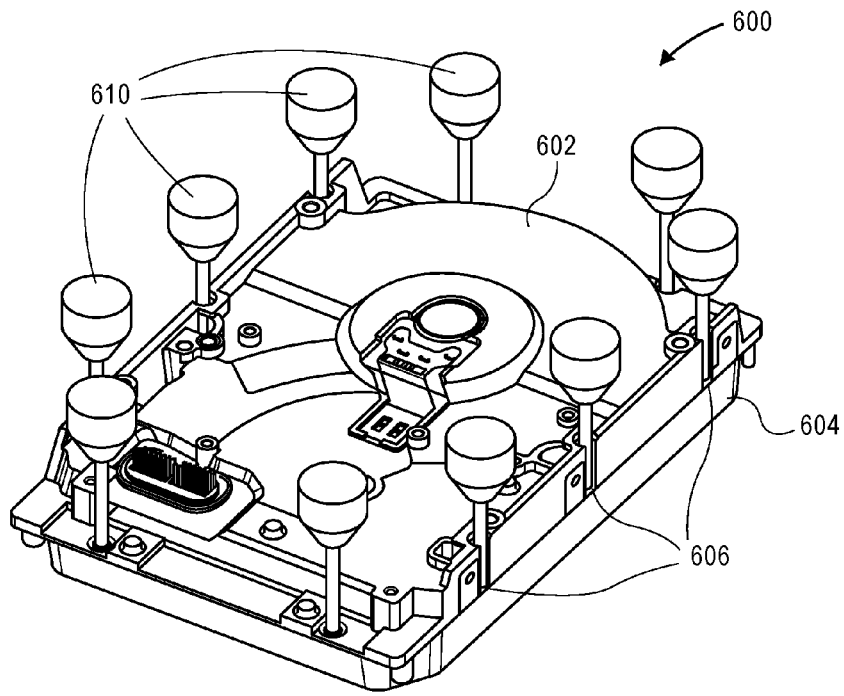
FIG. 8
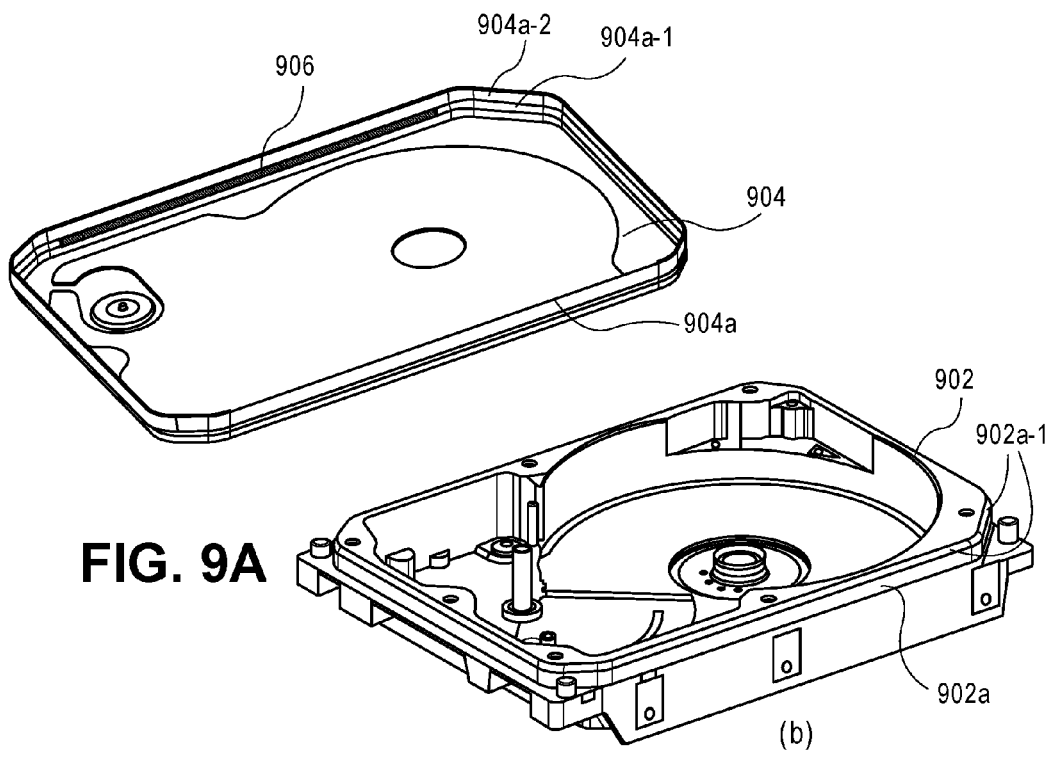
FIG. 9A
(b)
FIG. 9B

ADHESIVE COVER SEAL FOR HERMETICALLY-SEALED DATA STORAGE DEVICE

CROSS-REFERENCE TO RELATED APPLICATIONS

This application claims the benefit of priority to commonly-owned U.S. Provisional Patent Application No. 62/207,888 filed on Aug. 20, 2015, the entire content of which is incorporated by reference for all purposes as if fully set forth herein.

FIELD OF EMBODIMENTS

Embodiments of the invention may relate generally to data storage devices and more particularly to use of an adhesive cover seal for hermetically sealing a data storage device.

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head uses a magnetic field to read data from and write data to the surface of a magnetic-recording disk. A write head makes use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

HDDs are being manufactured which are hermetically sealed with helium inside. Further, other gases that are lighter than air have been contemplated for use as a replacement for air in sealed HDDs. There are various benefits to sealing and operating an HDD in helium ambient, for example, because the density of helium is one-seventh that of air. Hence, operating an HDD in helium reduces the drag force acting on the spinning disk stack and the mechanical power used by the disk spindle motor. Further, operating in helium reduces the flutter of the disks and the suspension, allowing for disks to be placed closer together and increasing the areal density (a measure of the quantity of information bits that can be stored on a given area of disk surface) by enabling a smaller, narrower data track pitch. The lower shear forces and more efficient thermal conduction of helium also mean the HDD will run cooler and will emit less acoustic noise. The reliability of the HDD is also increased due to low humidity, less sensitivity to altitude and external pressure variations, and the relative absence of corrosive gases or contaminants.

Electronic systems that require a hermetically-sealed internal volume (e.g., a lighter-than-air gas-filled, sealed HDD) need a way of preventing the occurrence of leakage through the interface between the cover and the corresponding enclosure base to which the cover is coupled. One approach is to utilize two covers: (1) one (a "first cover") being the typical HDD cover coupled to the base with fasteners and with a gasket seal therebetween, but not hermetically-sealed, with (2) another cover (a "second cover") being welded to the base over the first cover, such as by laser welding. However, sealing approaches involving laser welding secondary covers to the base are a relatively costly process in the context of the mass production of HDDs, with strict surface finish requirements and the cost of the welding equipment being main contributors to the cost. Furthermore, the welded seam is often a weak point, which may be damaged in the field by rough handling of the devices, whereby consequent leaks may result in an increased drive failure rate as compared to non-sealed products. Based at least on the foregoing, challenges remain with welded covers for hermetically-sealed HDDs.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are generally directed at a method of assembling a data storage device, by (a) forming an enclosure by overlapping each of a plurality of sidewalls of a cover with a corresponding sidewall of a base part, (b) dispensing a liquid adhesive between the respective sidewalls of the cover and base part in such a quantity at each of a plurality of locations to promote capillary flow of the liquid adhesive to form a continuous film of liquid adhesive between the sidewalls, and (c) curing the continuous film of liquid adhesive to form a hermetic seal between the cover and the base part. The hermetic seal provides for a lighter-than-air gas to be held therein.

Embodiments may include using base protrusions and/or cover dimples to set a suitable gap between the parts. Embodiments may include surface treating the outer surface of the cover sidewalls, the inner surface of the base sidewalls, or both the respective inner and outer surfaces of the sidewalls, which can help promote the capillary flow of the liquid adhesive.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 4 is a perspective view illustrating a hermetically-sealed HDD epoxy coverage inspection approach, according to an embodiment;

FIG. 5A is an exploded view illustrating a first example HDD adhesive seal configuration and FIG. 5B is a perspective view illustrating an assembled HDD from FIG. 5A, according to an embodiment;

FIG. 6A is a perspective view illustrating a tub cover and FIG. 6B is a perspective view illustrating a base, corresponding to a second example HDD adhesive seal configuration, and FIG. 6C is a perspective view illustrating the assembled HDD using the components of 6A and 6B, according to an embodiment;

FIG. 7A is a top perspective view and FIG. 7B is a bottom perspective view illustrating the adhesive filling features of FIG. 6B, according to an embodiment;

FIG. 8 is a perspective view illustrating a process of injecting epoxy adhesive into the adhesive filling features of FIG. 6B, according to an embodiment;

FIG. 9A is a perspective view illustrating a cover and FIG. 9B is a perspective view illustrating a base, corresponding to a third example HDD adhesive seal configuration, according to an embodiment;

DETAILED DESCRIPTION

Approaches to an adhesive seal for a hermetically-sealed data storage device are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of an Illustrative Operating Context

Embodiments may be used in the context of a hermetic seal for a hard disk drive (HDD) storage device. Thus, in accordance with an embodiment, a plan view illustrating an HDD 100 is shown in FIG. 1 to illustrate an exemplary operating context.

Figure 1:
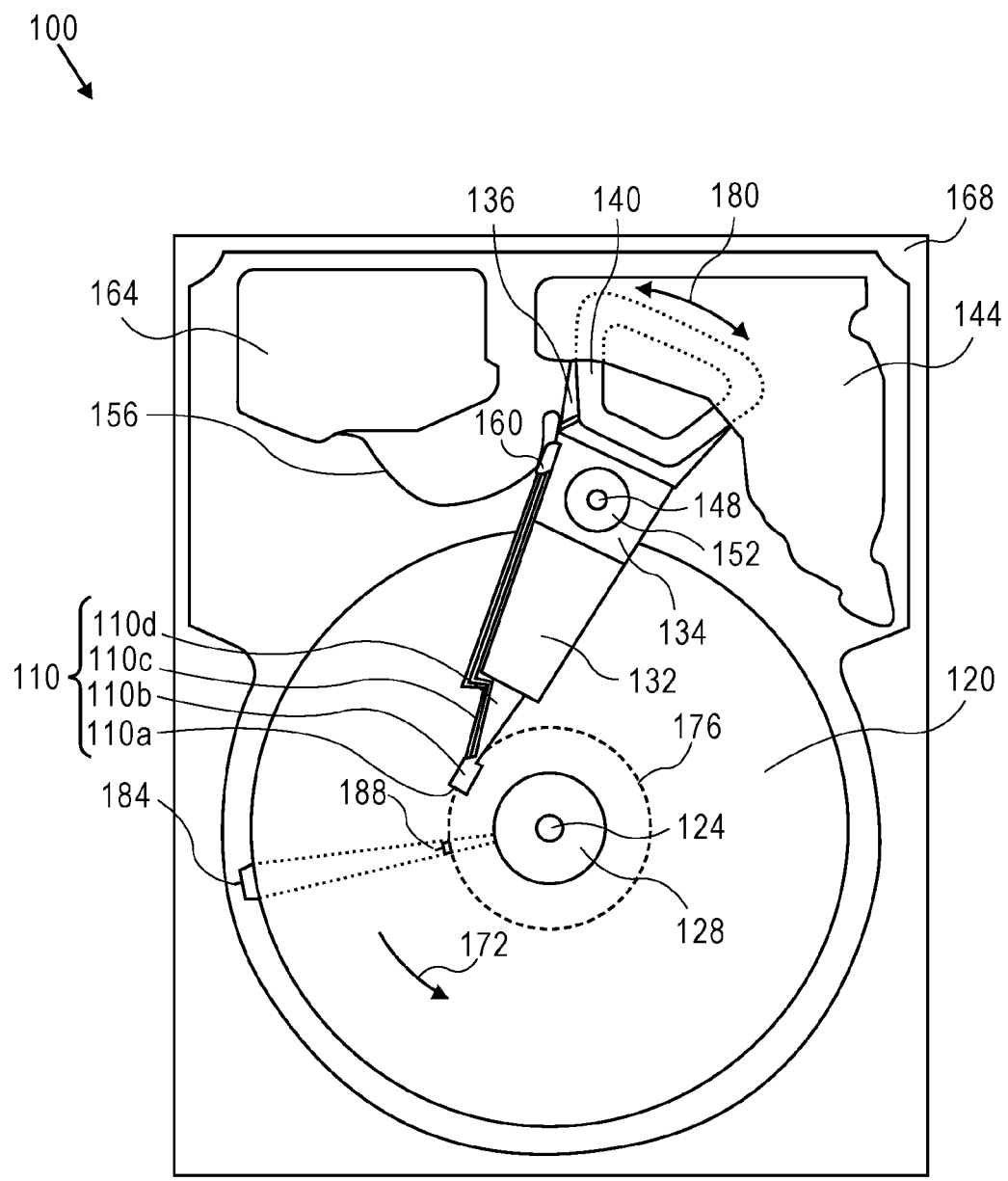
FIG. 1 is a plan view illustrating a hard disk drive (HDD), according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

The term "hermetic" will be understood to describe a sealing arrangement designed to have nominally no (or negligible) gaseous leakage or permeation paths. While terms such as "hermetic", "negligible leakage", "no leakage", etc. may be used herein, note that such a system would often still have a certain amount of permeability and, therefore, not be absolutely leak-free. Hence, the concept of a desired or target "leak rate" may be used herein.

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a sidewall as "substantially vertical" would assign that term its plain meaning, such that the sidewall is vertical for all practical purposes but may not be precisely at 90 degrees.

Recall that electronic systems that require a hermetically-sealed internal volume (e.g., a lighter-than-air gas-filled, sealed HDD) need a way of preventing the occurrence of leakage through the cover-to-base interface, with one approach being to utilize two covers, the second of which may be laser welded to the base, over the first cover.

Consider for example that a 3.5" form factor HDD has an enclosure perimeter approximately 500 mm long. If a simple flat metal cover is attached to the tops of the vertical sidewalls of a tub-style base, the width of the joint might typically be around 1 mm, or perhaps 2 mm at most. The sidewalls of the base are typically 5 mm thick or less, to provide room for internal components. In particular, the regions where the sidewalls pass by the outer diameter (OD) of the disk stack must be especially thin (at most 3 mm thick) simply because of the size of the disks (e.g., 95 mm diameter), the width of the form factor (101.6 mm) and provisioning for minimal clearance between the base sidewalls and the rotating disks. Furthermore, the full width of a sidewall generally cannot be used to create a sealing face for the cover. The assembly process for sealed drives may involve first attaching an inner cover with a preliminary gasket seal, followed by servo-writing and manufacturing test (which has imperfect yield, so performing these while the second cover is not in place allows reworkability), followed by attaching a hermetically-sealed second cover (after second cover attachment, the drive is no longer reworkable because the second cover seal/attachment is not reversible). Because the preliminary gasket seal of the first cover generally requires some sidewall top face width to achieve a seal, the amount of remaining sidewall top face width is reduced to around only 1 mm or less at the narrowest points next to the outer diameter of the disks.

While laser welding of the second cover to the base can successfully create a permanent hermetic seal with very little top face width on the base sidewall, laser welding is a relatively expensive process. A lower cost approach than laser welding, for joining and sealing the cover-to-base interface, may be to use an epoxy adhesive. Adhesive sealing methods described herein can serve as less expensive and a physically more robust alternatives to laser welding, and may contribute to achieving epoxy seals that meet the leak and form-factor requirements while being suitable for cost-effective mass manufacturing.

Adhesive Seal for Hermetically-Sealed Data Storage Device-Generally

An adhesive seal uses an adhesive material, such as an epoxy or a pressure sensitive adhesive (PSA), to fill gaps between two parts. For example, an adhesive seal may be used to fill gaps between a second cover and a base casting of an HDD, which are individually largely impermeable to helium, to create a seal between the two parts that meets a certain leak requirement.

Achieving a low enough leak rate for a cover seal using epoxy generally may or should consider the following: (a) the type of epoxy adhesive used, for a non-limiting example, a low permeability epoxy adhesive such as alumina-filled H72 epoxy from Epoxy Technology (EpoTek) is considered suitable; (b) the bond line thickness between the cover and the base, with a preference for a thin bond line, for a non-limiting example, around 0.1 mm or less is considered suitable; and (c) the width (or height) of the seal, which is the overlap region between the cover and the base, with a preference for a wide (or long) seal, for a non-limiting example, around 5-10 mm or more is considered suitable.

The need for a wide seal [e.g., (c) above] presents a challenge to achieving an adequate seal with a simple horizontal bond line between a base sidewall and a cover. Although reducing the width of the bond could be compensated for by reducing the thickness of the bond, consistently achieving such a thin bond line would rely on, for example, an exceptionally good surface finish (e.g., low roughness) and extremely tight geometric tolerances (e.g., planarity, or flatness) on the mating surfaces and/or very small or no filler particles within the epoxy (which, by the way, are useful for achieving low permeability of the epoxy in the first place). However, achieving a bond line having a thickness of approximately 0.05-0.1 mm is considered achievable with typical machined surfaces and commercially available epoxy.

Cover Over-Wrap Approach

A hermetically-sealed HDD (or, throughout this description, other types of data storage devices) enclosure may comprise a base and one or more covers, recalling that one approach is to employ a conventional first cover with a second cover affixed (e.g., welded) thereover. Herein throughout, unless otherwise indicated the term "cover" is used to refer to the second cover. The base is typically thicker than the cover and has more features for component attachments and customer mounts. The cover is simpler and mostly used for creating a closed, hermetically-sealed enclosure.

A quality laser weld has almost no permeability to helium, thus a thin laser weld can satisfy the typical leak requirement. However, adhesives are relatively more permeable, and require a longer seal. To enable a longer seal within the common drive form factor, a more complex cover design may be beneficial. As mentioned, near the disk OD, the top edge of the base wall is narrow and, as a result, a long seal can only be created between the cover and the vertical sidewalls of the base.

Figure 2:
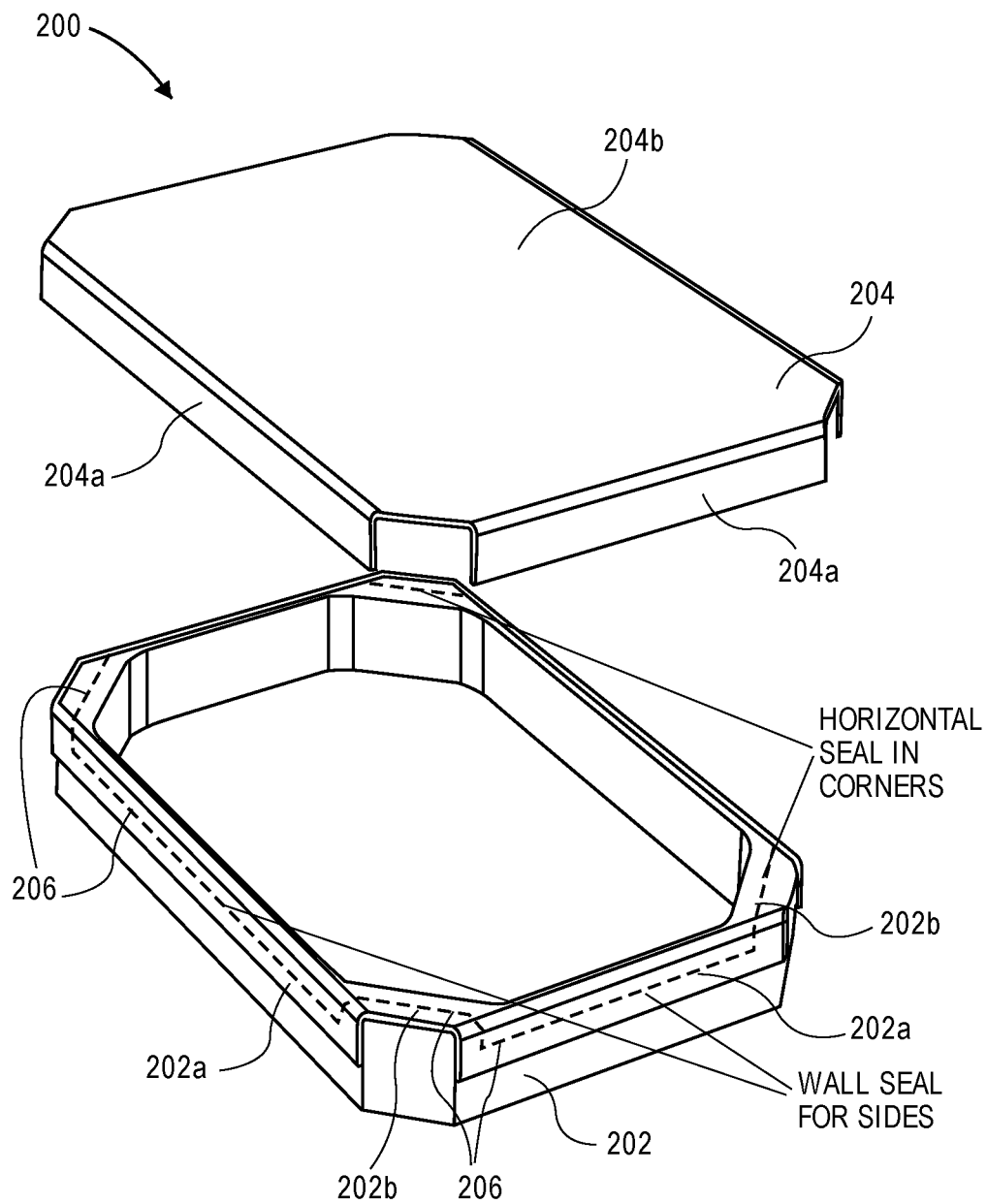
FIG. 2 is an exploded view illustrating a hermetically-sealed HDD cover over-wrap approach, according to an embodiment.

FIG. 2 is an exploded view illustrating a hermetically-sealed hard disk drive (HDD) cover over-wrap approach, according to an embodiment. For sake of simplicity and clarity, FIG. 2 only depicts an HDD base 202 and an HDD cover 204 of an HDD enclosure 200, omitting the illustration of any HDD internal components and a first cover, while illustrating an example internal shape of the base 202 to depict certain features such as horizontal surfaces 202b. Reference is made to FIG. 1 for a description of other components of a hard disk drive that may be implemented in or with the HDD enclosure 200. The manner in which the cover 204 may be configured and fabricated may vary from implementation to implementation, according to various embodiments described elsewhere herein. Regardless, with a "cover over-wrap" approach, according to an embodiment, the hermetic seal (or simply "seal") is fabricated onto the vertical sidewalls 202a of the base 202 ("wall seal" portion) and onto the horizontal surfaces 202b in the corners of the base 202 ("horizontal seal" portion), whereby the horizontal seal in the corner connects the seal corresponding to the discontinuous sides 204a of the cover 204, and whereby the horizontal seal is between the planar top portion 204b of cover 204 and each corresponding horizontal surface 202b of base 202.

According to an embodiment, the cover 204 is fabricated by bending a metallic sheet. Related embodiments include (a) pre-forming the cover 204, by bending a metallic sheet prior to assembly with the base 202, and (b) forming a "shape-in-place" cover 204, by bending a metallic sheet while assembling with the base 202, thereby effectively utilizing the base 202 as a shaping mold.

According to an alternative embodiment, the cover may be pre-formed into a bath tub-shaped (or simply "tub") cover, which is pre-formed into a 3-dimensional shape having the main planar portion and the continuous sidewalls prior to assembly with the base. A tub cover is described in more detail elsewhere herein, such as with reference to FIGS. 6A-C, 9A, 9B, 10A-C. For a non-limiting example, a pre-formed tub cover may be fabricated using a deep drawing process, which is a well-known sheet metal forming process, thereby forming a deep-drawn tub cover. A deep-drawn tub cover would have no discontinuity in the corners, but may be more challenging to use with solid adhesive films (e.g., pressure-sensitive adhesive, or "PSA" films) that benefit from full contact with the other mating part.

Sealing Adhesive Materials and Applications

As a variety of adhesives exist, one fundamental characteristic to consider in selecting a suitable adhesive for forming a hermetic seal between or among a cover 204 and base 202 in a helium-filled HDD is for the adhesive to have a low permeability to helium. Likewise, if some other lighter-than-air gas is used for filling an HDD, the adhesive's permeability to that gas would be a characteristic to consider.

With a proper joint design, epoxies have a sufficient permeability to helium to create an effective helium seal. Epoxies can be applied in liquid form, or as a tacky film pre-applied or slathered onto a part (i.e., "B-staged"). In the liquid form, the epoxy can be applied to a part before the parts are assembled together if a high viscosity formulation is used. Alternatively, a low viscosity liquid epoxy can be dispensed and drawn into the seal using capillary action (or "capillary flow"), referring to the tendency of a liquid to flow or be drawn into narrow spaces without the assistance of external forces, i.e., as a result of the intermolecular attraction within and between the liquid and solid materials. While other adhesives, such as PSAs, generally have a higher permeability than epoxies, at least one type (Adhesive Research PSA EL-92734) can still meet the application requirements. Such adhesives can be applied prior to mating the parts. These adhesive generally do not require a curing step after joining of the mating parts, and are preferred in that sense.

For embodiments in which a liquid epoxy seal is used, the flow of the epoxy should preferably be managed. According to an embodiment, one technique for controlling the liquid epoxy flow is to have a limited number of fill points, where a sufficient amount of epoxy is injected or dispensed and is then transferred into the joint by capillary action. According to a related embodiment, one or more channels connected to one or more fill points are provided, which help spread the epoxy along the seal periphery, thereby shortening the capillary flow length. Such channels may be formed constituent to the cover 204 (FIG. 2) and/or the base 202 (FIG. 2), or may be formed by a secondary part such as adhesive tape, for non-limiting examples. According to another embodiment, the epoxy may be applied (e.g., dispensed) along the whole perimeter of the base-cover interface, in which case a channel can be used to contain the deposited epoxy until it is drawn into the joint using capillary action.

For embodiments in which a PSA seal is used, the HDD assembly may comprise a shape-in-place sheet metal cover (e.g., cover 204 of FIG. 2) and a base (e.g., base 202 of FIG. 2), according to an embodiment. The cover 204 or the base 202 has the PSA pre-applied as a backing. First, the blank sheet metal composing the cover 204 is aligned to the base 202. Next, the sheet metal is brought into contact and pressed against the base 202 to create the seal in the flat top areas of the base 202, including the corners. Finally, the sheet metal is bent so that sidewalls 204a of the cover 204 are formed and pressed onto the sidewalls 202a of the base 202 to create the seal on the mating sidewalls, by way of the PSA. The assembly process should be performed such that the cover 204 fully conforms and bonds to the base 202, leaving no to negligible void channels for leaking helium or some other lighter-than-air gas. A thin and/or soft cover and/or a proper bending procedure, such as with a rolling action, may be used to ensure proper assembly and sealing.

According to an embodiment, a hybrid of the foregoing embodiments may be implemented. For example, a PSA may be used to fixture and/or set a gap between a base (e.g., base 202 of FIG. 2) and a cover (e.g., cover 204 of FIG. 2), with epoxy then used to complete the sealing arrangement and, hence, to obtain a low-leak-rate seal.

Seal Configurations

Generally, the path of an adhesive seal can take multiple forms. For example, an epoxy seal between a tub cover and a base may follow a simple path around the perimeter of the sidewalls of the base and the tub cover. In such an adhesive seal configuration, it is preferable that the tub cover has a complete tub shape (i.e., having continuous sidewalls, including corners) and a suitable seal all the way around the perimeter, including the corners. For another example and with reference to FIG. 2, which may apply to both a tub cover and/or a bent sheet metal cover, the seal 206 (FIG. 2) may be formed along the sidewalls of the base and cover for the long straight parts of the sidewalls (denoted as "wall seal" in FIG. 2), and then be formed up over the top in the corners (denoted as "horizontal seal" in FIG. 2). In the corners, the seal 206 is between corner surfaces 202b on the base 202 and the planar top portion 204b of the cover 204. This more complex path allows for covers with open corners (e.g., bent/folded sheet metal covers, such as 204), or tub covers which do not seal well in the corners. The horizontal corner surfaces 202b of the base 202 should be wide enough so that a seal width of at least several millimeters wide (preferably around 10 mm wide, according to an embodiment) can be achieved, as it is along the sidewalls (e.g., sidewalls 202a of base 202).

One approach to assembling and sealing a cover onto a base is to use an interference fit, whereby the cover 204 sidewalls 204a are deflected outward, thus exerting inward force to the base 202 sidewalls 202a while pushing the cover 204 down onto the base 202. However, a simple interference fit can risk tearing or cracking the cover 204 material, especially with a tub cover. Such risk is due, at least in part, to limitations on the manufacturing tolerances associated with both the cover 204 and the base 202. Thus, the precise amount of interference and the corresponding amount of stretching and cover perimeter increase may cause sufficient stress on the cover 204 to introduce risk of tearing or cracking the cover 204.

Seal Thickness Control

With a permeable material, naturally the leak rate increases with the seal thickness because a thicker seal provides a wider leak channel. Therefore, in practice there is a maximum limit on the seal thickness that would correspond with a given allowable leak rate for the seal. Furthermore, the thickness of the adhesive seal should be controlled in view of the mating part tolerances. A suitable epoxy adhesive seal width in on the order of around 0.1 mm, for a non-limiting example.

Figure 3:
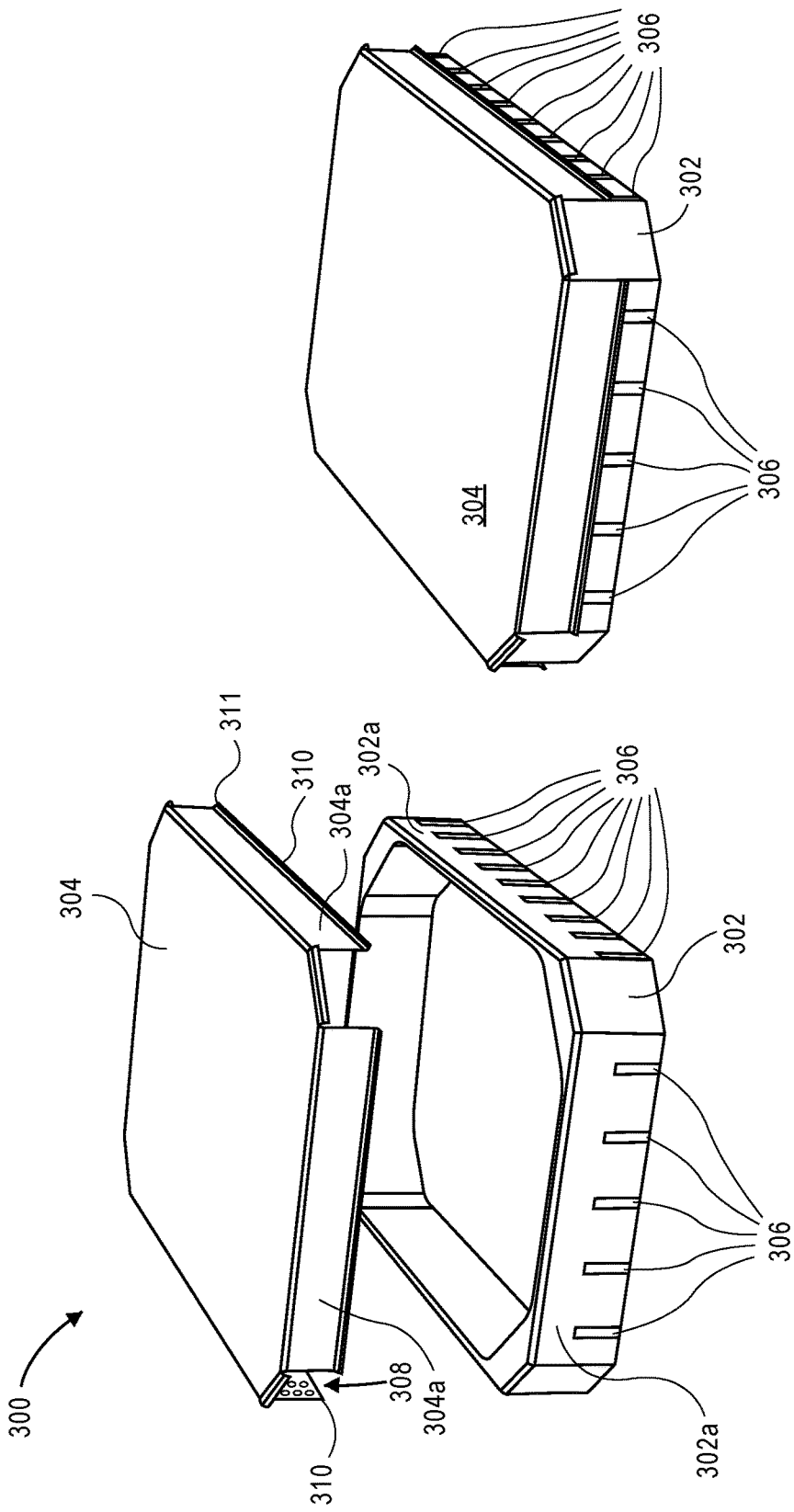
FIG. 3A is an exploded view and FIG. 3B is a perspective view illustrating a hermetically-sealed HDD gap control approach, according to an embodiment.

With continuing reference to FIG. 2, one approach to controlling the gap between a base, such as base 202, and a cover, such as cover 204, is to use protrusions or ridges on the base surface, according to an embodiment. FIG. 3A is an exploded view and FIG. 3B is a perspective view illustrating a hermetically-sealed hard disk drive (HDD) gap control approach, according to an embodiment. For sake of simplicity and clarity, FIG. 3A only depicts an HDD base 302 and an HDD cover 304 of an HDD enclosure 300, omitting the illustration of any HDD internal components and a first cover. Reference is made to FIG. 1 for a description of other components of a hard disk drive which may be implemented in or with the HDD enclosure 300.

As depicted in FIGS. 3A and 3B, the base 302 of enclosure 300 comprises a plurality of protrusions 306, protruding from and spaced around the outer surface of the sidewalls 302a of the base 302. These protrusions 306 may be cast with or machined into the base 302, for example. The number, shape and spacing of the protrusions 306 depicted in FIGS. 3A, 3B are each depicted for purposes of example.

Hence, the number, shape and spacing of the protrusions 306 may vary from implementation to implementation based, for non-limiting examples, on the respective geometries of the base 302 and cover 304, the type of adhesive used and its viscosity and permeability, the desired leak rate through the seal for the particular gas used, and the like.

According to an alternative embodiment, dimples 308 may be formed onto the cover 304 in order to set the gap between the base 302 and the cover 304. For example, an array of dimples 308 (e.g., with a height of approximately 0.05-0.1 mm) may be formed into the cover 304 sidewalls 304a (thereby creating a form of controlled roughness) to set the gap width but to allow a suitable flow of epoxy throughout the seal area. While, for purposes of simplicity and clarity, dimples 308 are depicted on only one sidewall 304a of the cover 304, the dimples 308 may be implemented on each sidewall 304a. Furthermore, a combination of protrusions 306 on the base 302 and dimples 308 on the cover 304, possibly in an alternating pattern, may be used to set the desired gap between the base 302 and the cover 304, whereby such a configuration could contribute to a more desirable leak path, for example.

According to an embodiment, the sidewalls 304a of the cover 304 are bent in past vertical, such that the sidewalls 304a are preloaded against the base 302 as the cover 304 is assembled onto the base 302.

Whereas the protrusions 306 or dimples 308 set the gap between the respective sidewalls 304a of the cover 304 and the sidewalls 302a of the base 302 at the perimeter edge 311 of the sidewalls 304a, a bend 310 at the edge 311 of the cover 304 may be used to add rigidity to the sidewall 304a, according to an embodiment. With a cover 304 configuration in which a bend 310 is implemented, a fewer number of protrusions 306 may be used to set the desired uniform gap along the whole edge 311. The bend 310 at the edge 311 can also serve as a chamfer to guide the insertion of an over-bent cover 304 onto the base 302. The bend 310 can be pressed to flat or machined off at the end of the assembly process, if desired.

According to an embodiment, an alternative method for setting the gap between a base (e.g., base 202 of FIG. 2) and a cover (e.g., cover 204 of FIG. 2) is to use adhesive ridges (or "steps") pre-applied to either the base 202 or the cover 204. In this scenario, the cover should preferably be bent to an open position (i.e., with the sidewalls 204a>90° from the planar top portion 204b), such that the cover 204 can be placed over the base 202 and rest on the top surfaces of the base 202 without the sidewalls 204a of the cover 204 making contact with the sidewalls 202a of the base 202. Once the cover 204 is fully established or seated onto the base 202, the sidewalls 204a are to be pressed to contact and bond onto the base 202 by way of the adhesive steps (not visible). Thus, the thickness of the adhesive steps sets the gap between the base 202 and the cover 204, however, the steps are not expected to create a seal. Rather, the steps are primarily used to control the gap in the presence of any spring-back loads or tolerance mismatch. Once the cover 204 is fully seated onto the base 202 and the sidewalls 204a pressed into contact with the sidewalls 202a of the base 202, additional adhesive may be applied to create a complete seal.

If setting a gap as close as possible is desired, the cover 204 can be bent and formed onto the base 202 directly (i.e., a shape-in-place cover), according to an embodiment. To minimize the amount the sidewalls 204a may spring back after formation, a thicker sheet and/or a softer material for the cover 204 may be considered for use. If the shape-in-place forming process forces are too significant for the base 202 to handle, then a mostly pre-formed cover 204 can be pressed onto the base 202 to take the exact shape of the base, with minimal application of force(s) to the base 202. According to an embodiment, an alternative way of setting a close gap would be to use a pre-formed cover 204 that has been pre-stressed and shaped, such that its interference and spring-action results in the cover 204 conforming onto the sidewalls 202a of the base 202.

With an interference fit with a tub cover, the cover 204 sidewalls 204a are deflected outward, thus exerting inward force to the base 202 sidewalls 202a while pushing the cover 204 down onto the base 202. However, a simple interference fit can risk tearing or cracking the cover 204 material. Such risk is due, at least in part, to limitations on the manufacturing tolerances associated with both the cover 204 and the base 202. Thus, the precise amount of interference and the corresponding amount of stretching of the tub cover perimeter may fall within a range that introduces risk of tearing or cracking the cover 204.

Fixturing

When bonding the base 202 (FIG. 2) and cover 204 (FIG. 2) together, the mating parts should be positioned accordingly and held together for the adhesive to bond, a process referred to as "fixturing". Fasteners, such as screws and rivets, can be used to hold the mating parts. Any holes associated with such fasteners are preferably outside of the seal area or, if inside the seal area, any gaps between the fasteners and corresponding holes are filled with sealing adhesive. Alternatively, the initial tackiness of an adhesive is one way to hold the mating parts together, which can work reasonably well with PSA and B-staged epoxy. Another alternative, which is perhaps more suitable for liquid epoxies, is to use an interference fit. With an interference fit, the fitting forces can be managed and limited by relying on the flexibility of one of the mating parts. Further, a clearance fit with controlled tolerances can be used for fixturing. Still further, a separate external fixture/tool may also be used.

Surface Treatments

A suitable surface treatment of one or both of the mating parts (i.e., base 202 and cover 204 of FIG. 2) can significantly improve the adhesive bonding strength, as well as improve the aforementioned capillary action, which is important in scenarios in which liquid epoxy is applied relying on capillary flow. Several suitable surface treatment techniques, according to embodiments, are (a) bead-blasting (or abrasive blasting, generally); (b) chemical etching, (c) formed features, e.g., knurling, and (d) cut features, e.g., offset fly cutter marks.

Inspection for Epoxy Coverage

In the scenarios in which liquid epoxy is used, adequate filling of the joint interface by epoxy is needed to provide the required sealing performance. Although a proper design (e.g., surface treatment for enhanced capillary flow, or seal joint gap control, as described elsewhere herein) can ensure complete epoxy flow coverage, inspection and monitoring techniques may still be necessary for quality control and yield improvement.

FIG. 4 is a perspective view illustrating a hermetically-sealed hard disk drive epoxy coverage inspection approach, according to an embodiment. Similar to previously-described embodiments, HDD 400 comprises a base 402 and a cover 402. According to an embodiment, HDD 400 further comprises a plurality of inspection holes 406, which are small holes spaced at suitable intervals around the periphery of the cover 402. As the adhesive wicks around the perimeter of the cover-base gap, it would fill each inspection hole 406. After the adhesive is cured, if the adhesive is visible in each inspection hole 406, it is highly likely and thus can be assumed that each path from an adhesive introduction point to a inspection hole 406 has been filled with adhesive. Hence, adequate adhesive coverage at the cover-base interface can be ensured through use of the inspection holes 406. According to a related embodiment, a colorant is added to the adhesive for ease of inspection. Such an inspection via the inspection holes 406 may be manually performed by a human operator, or may be automated using computer-vision systems, for example. Alternatively, an ultra-sound inspection method may be used to assess epoxy coverage between the cover and the base.

Example Hard Disk Drive Cover Adhesive Seal Configurations

The foregoing design alternatives can be combined in numerous ways to implement a detailed hard disk drive adhesive seal design. Several non-limiting example embodiments, suitable for sealing a hard disk drive and combining features described elsewhere herein, are described as follows.

Capillary Epoxy Seal with Bent Cover

FIG. 5A is an exploded view illustrating a first example HDD adhesive seal configuration and FIG. 5B is a perspective view illustrating an assembled HDD from FIG. 5A, according to an embodiment. In this embodiment, a pre-formed bent (or folded) sheet metal cover 504 ("bent cover 504") is positioned over a base 502. The base 502 has protrusions 506, which are 25-100 micrometers thick, for example, and are used for setting a gap between the bent cover 504 and the base 502. Once the bent cover 504 is positioned over the base 502, the assembly is placed upside down, with the bent cover 504 resting against the supporting surface. Epoxy is applied at the edge of the seal, either all along the periphery or at fixed injection points. The HDD assembly 500 is placed in an oven for the epoxy to cure at elevated temperatures. The dispensed epoxy is automatically drawn into the seal using capillary action, which can manage epoxy flow without leakage in the corners.

With a pre-formed bent cover, tight gap control can be achieved, where the bend-to-bend tolerances can be controlled by bending the cover onto a master die. Any bend angle tolerance can be absorbed by the flexibility of the part, and the cover may be over-bent such that it is preloaded on the base when assembled. While the first example HDD adhesive seal configuration shown and described in reference to FIGS. 5A, 5B is in the context of a pre-formed bent cover 504, similarly, a shape-in-place type of bent cover could be used, as described elsewhere herein. With a shape-in-place type of bent cover, base casting tolerances are readily absorbed. Thus, a shape-in-place approach can potentially avoid base machining processes.

Capillary Epoxy Seal with Tub Cover and Fixed Fill Points

FIG. 6A is a perspective view illustrating a tub cover and FIG. 6B is a perspective view illustrating a base, for a second example HDD adhesive seal configuration, and FIG. 6C is a perspective view illustrating the assembled HDD using the components of 6A and 6B, according to an embodiment. A variation on the bent sheet cover-based seal illustrated and described in reference to FIGS. 5A, 5B, employing a different combination of the approaches described elsewhere herein, is the use of a deep-drawn tub cover 604 and a number of fixed adhesive filling features 606 in a base 602 of an HDD assembly 600. For example, the tub cover 604 may comprise a 5-degree wall slope and the base 602 may comprise a 5-degree chamfer (as opposed to a vertical wall) to facilitate placement and positioning of the tub cover 604 onto the base 602. Additionally, or alternatively, an interference fit may be utilized (e.g., with a relatively soft aluminum cover), forcing the cover over the edge of the base to form the cover to the actual base dimensions. The filling features 606 may be defined by slots or wells into which liquid epoxy is dispensed while the HDD assembly 600 is positioned upside down.

FIG. 7A is a top perspective view and FIG. 7B is a bottom perspective view illustrating the adhesive filling features of FIG. 6B, according to an embodiment. In this example, ten adhesive filling features 606 are depicted for a non-limiting example, as slots, roughly equally spaced along the perimeter of the base 602. Because the adhesive filling features 606 should to be located in areas where the sidewall of the base 602 is relatively thick, the thin-walled area near the disk outer diameter is preferably avoided.

FIG. 8 is a perspective view illustrating a process of injecting epoxy adhesive into the adhesive filling features of FIG. 6B, according to an embodiment. With the HDD assembly 600 upside down, with the tub cover 604 in place over the base 602, a low viscosity liquid epoxy can be simultaneously dispensed into the ten adhesive filling features 606 (using corresponding dispensers 610), as depicted in FIG. 8. Capillary action spreads the epoxy rapidly along the entire perimeter interface between the base 602 and the tub cover 604.

As an aside, a possible advantage of a tub cover over a bent sheet metal cover is that there is considerably less possibility of epoxy leakage from the corners of a cover while the drive is upside down because the tub shape contains the epoxy around the entire perimeter interface. Regardless, care should still be taken to dispense an appropriate amount of epoxy into each adhesive filling feature 606 to avoid overflow. If each adhesive filling feature 606 has an adequate volume to serve as a source for enough epoxy to fill the entire perimeter seal, then a single injection of epoxy can be performed quickly, and the capillary spreading can take place without further dispensing of epoxy. On the other hand, if the adhesive filling features 606 do not have enough volume to provide for the full amount of a given epoxy (with a corresponding viscosity) needed to fill the complete seal, then multiple injections may be used, or a slower-rate single injection that allows some spreading while the filling process is being performed. To cure the epoxy, the HDD assembly 600 may be placed upside down in an oven, for example, where the weight of the HDD assembly 600 maintains the base 602 and the tub cover 604 together while the epoxy solidifies and bonds the parts together.

A challenge associated with a deep-drawn tub cover, such as tub cover 604, is that tight tolerances would be preferable for both the sloped chamfer on the base (if used) and the sidewalls of the tub cover (if used), in order to achieve a small, well-controlled gap all the way around the perimeter for the epoxy to fill by capillary action. In such a scenario, in lieu of or in addition to such tight tolerances, protrusions such as protrusions 306 (FIGS. 3A, 3B) may be used with this embodiment to help set the gap spacing.

Epoxy Bead Seal with Tub Cover with Self-Alignment Skirt

While capillary filling works well for low-viscosity epoxy, a disadvantage of low-viscosity epoxy is that it tends to have higher gas permeability in the cured state than a higher-viscosity epoxy. A higher-viscosity epoxy filled with solid particles may have too high a viscosity for capillary filling, but shows significantly lower gas permeability in the cured state. Thus, a sealing approach directed at a high-viscosity epoxy is as follows.

FIG. 9A is a perspective view illustrating a cover and FIG. 9B is a perspective view illustrating a base, illustrating a third example HDD adhesive seal configuration, according to an embodiment. A tub cover 904 (e.g., deep-drawn) is configured to mate with a base 902 having appropriate mating surfaces, such as a chamfer 902a-1 (e.g., a 25 degree chamfer, for a non-limiting example) along the perimeter sidewall 902a. The tub cover 904 and the base 902 are intended for bonding together, i.e., hermetically sealing, by way of a bead 906 of high-viscosity epoxy adhesive. In this context, a "bead" refers to an applied line of adhesive. While FIG. 9A depicts an applied epoxy bead along only one side, for purposes of simplicity and clarity, in practice epoxy should be dispensed in a continuous bead 906 around the complete perimeter of the sidewall 904a of the tub cover 904, or the sidewall 902a of the base 902.

According to an embodiment, the sidewall 904a of tub cover 904 has a sloped section 904a-1, where the epoxy seal is formed, and an alignment skirt 904a-2, which may have a lower slope or which may be completely vertical (as depicted in this example). The alignment skirt 904a-2 serves to self-align the cover 904 as it is lowered onto the base 902 in order to prevent accidental smearing of the epoxy bead 906 by unwanted contact.

Figure 10A:
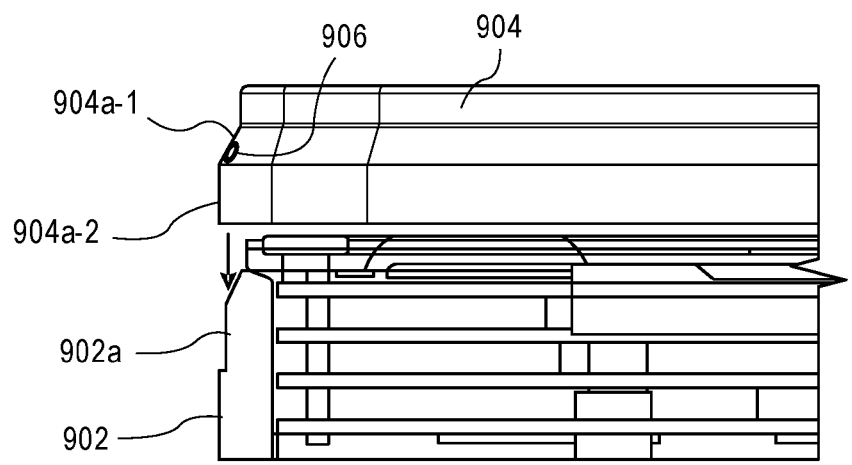
FIGS. 10A, 10B, and 10C are side views illustrating a cover installation process corresponding to the third example HDD adhesive seal configuration of FIGS. 9A, 9B, according to an embodiment.
Figure 10B:
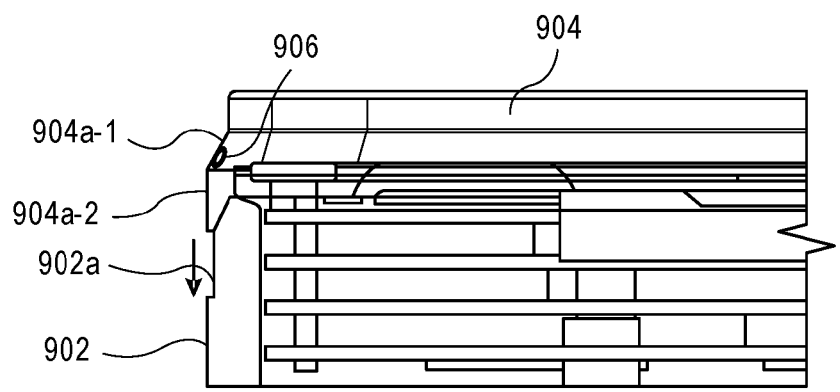
Figure 10C:
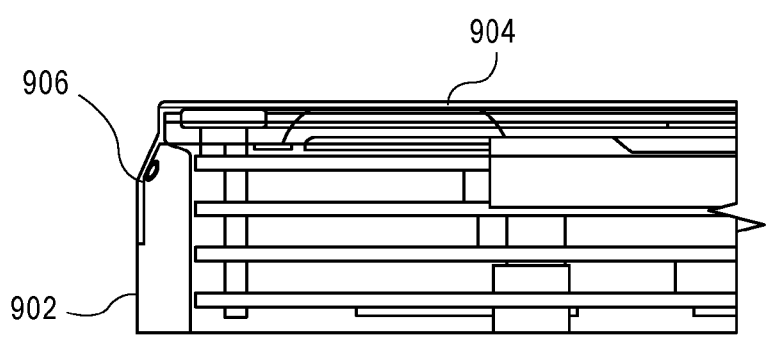

FIGS. 10A-10C includes side views illustrating a cover installation process associated with the third example HDD adhesive seal configuration of FIG. 9A, 9B, according to an embodiment. Prior to lowering the cover 904 onto the base 902, the epoxy bead 906 has been applied as shown in FIG. 9A. FIG. 10A depicts the cover 904, with epoxy bead 906, positioned over the base 902. As the cover 904 is lowered to the point of touching the base 902, as depicted in FIG. 10B, the alignment skirt 904a-2 makes contact with the sidewall 902a of the base 902 and self-aligns the cover 904 before the epoxy bead 906 can come into contact with anything. Unwanted contact with the wrong part of the base 902 could smear the epoxy bead 906, thereby preventing a good seal from forming. In FIG. 10C, the cover 904 is fully in place, and the epoxy ends up between the sloped section 904a-1 of the cover 904 and the chamfer 902a-1 of the sidewall 902a of the base 902. The bead compresses to a thin film, filling the gap along the sloped section 904a-1 and forming a robust hermetic seal. Because a high-viscosity epoxy is used in this example scenario, a narrower seal width may be used, such as only a few millimeters wide. The width of the seal can be adjusted, however, by changing the slope of the sloped section 904a-1 and the amount of the thickness of the sidewall 902a of the base 902 consumed by the chamfer 902a-1. After installation of the cover 904 onto the base 902, the epoxy can be cured in an oven with the HDD assembly upside down, holding the cover and baseplate together until the epoxy solidifies and bonds the parts together.

Figure 11:
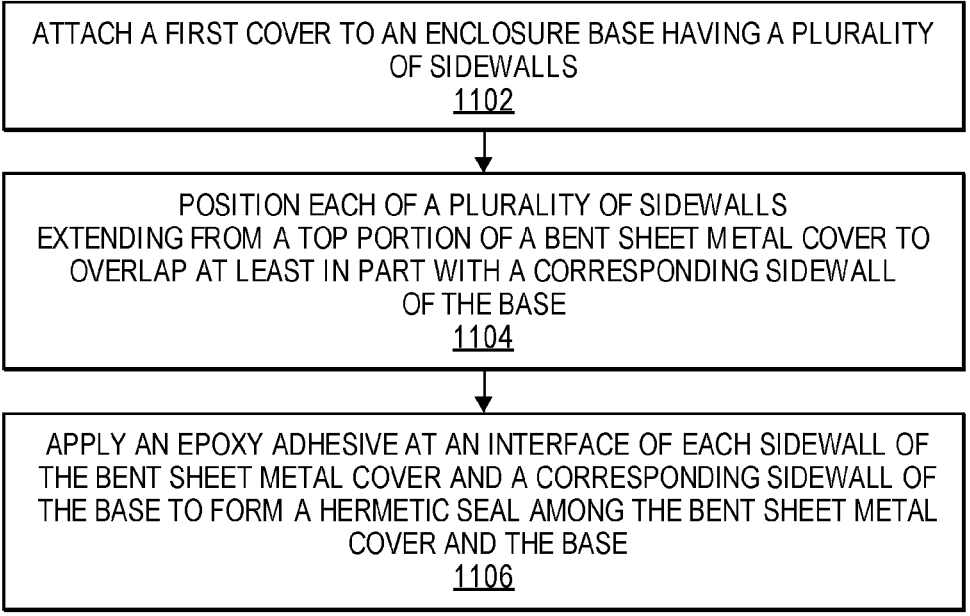
FIG. 11 is a flowchart illustrating a method for assembling a data storage device, according to a first embodiment.

Methods of Assembling a Data Storage Device with a Bent Sheet Metal Cover and Perimeter Adhesive Seal FIG. 11 is a flow diagram illustrating a method of assembling a data storage device, according to an embodiment.

At block 1102, a first cover is attached to an enclosure base having a plurality of sidewalls. For example, a conventional HDD cover may be attached to the base with fasteners and with a gasket seal therebetween, whereby servo-writing and manufacturing test may follow.

At block 1104, each of a plurality of sidewalls extending from a top portion of a bent sheet metal cover is positioned to overlap at least in part with a corresponding sidewall of the base. For example, each sidewall 204a (FIG. 2) extending from top portion 204b (FIG. 2) of a bent sheet metal version of cover 204 (FIG. 2) is positioned to overlap with a corresponding sidewall 202a (FIG. 2) of base 202 (FIG. 2), where the bent sheet metal cover 204 may be a pre-formed cover or a shape-in-place cover.

At block 1106, an epoxy adhesive is applied at an interface of each sidewall of the bent sheet metal cover and each corresponding sidewall of the base to form a hermetic seal between (or "among" the parts, as the adhesive could be applied at or near where the bottom edge of the cover meets the base) the bent sheet metal cover and the base. For example, an epoxy adhesive is applied between each sidewall 204a of the cover 204 and each corresponding sidewall 202a of the base 202 to form a hermetic seal between the bent sheet metal cover 204 and the base 202. As described in reference to FIGS. 5A, 5B, the epoxy adhesive may be applied (e.g., dispensed, or slathered), for example, either all along the periphery or at injection points, whereby the dispensed epoxy is automatically drawn into the seal using capillary action prior to (and possibly during) curing at an elevated temperature. Furthermore, as described in reference to the tub cover 904 of FIG. 9A, the epoxy adhesive may be dispensed, for example, as a continuous bead around the complete perimeter of the sidewall 204a of the tub cover 204, or the sidewall 202a of the base 202.

Additional embodiments may include setting a gap between the sidewalls based on a plurality of protrusions (e.g., protrusions 306 of FIGS. 3A, 3B) extending outward from the outer surface of each sidewall of the base, or setting a gap between the sidewalls based on a plurality of dimples (e.g., dimples 308 of FIG. 3A) extending inward from the inner surface of each sidewall of the bent sheet metal cover. Additional embodiments may include inspecting the epoxy adhesive through inspection holes (e.g., inspection holes 406 of FIG. 4) through each sidewall of the gent sheet metal cover.

Figure 12:
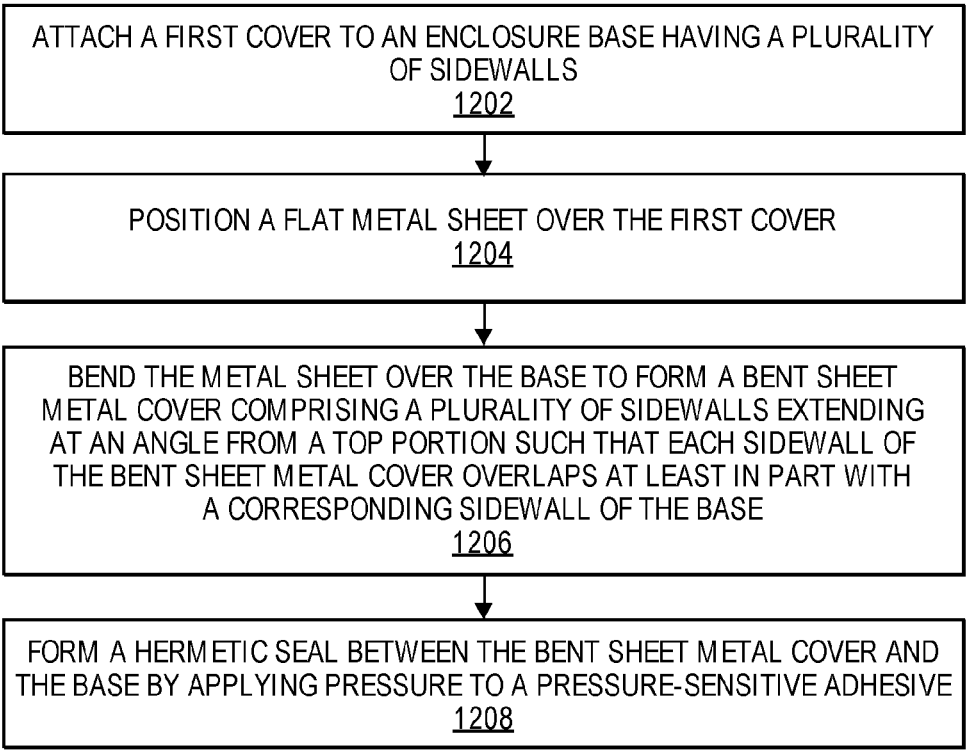
FIG. 12 is a flowchart illustrating a method for assembling a data storage device, according to a second embodiment.
Figure 13C:
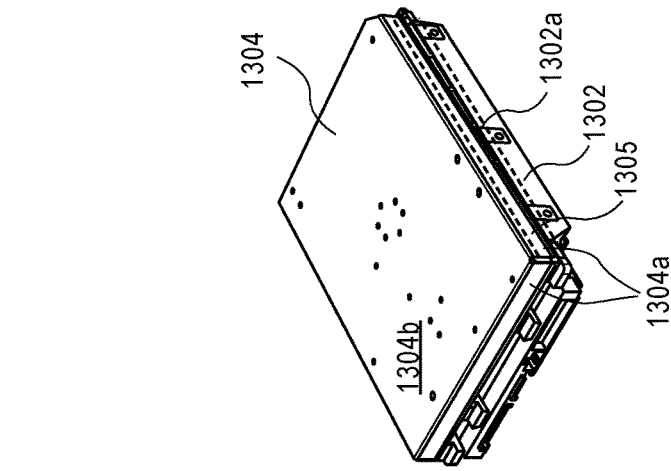
FIG. 13C is a perspective view illustrating an assembled HDD from the process corresponding with the fourth example, according to an embodiment.
Figure 13B:
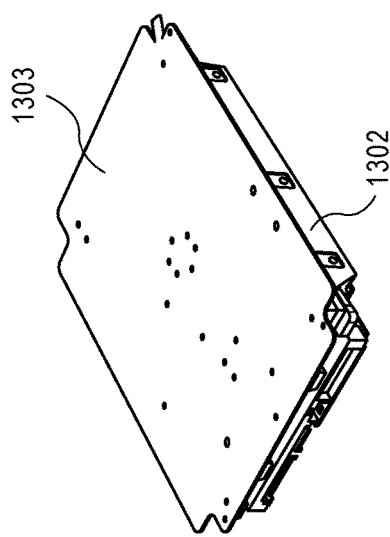
FIG. 13B is a perspective view illustrating a step in the process corresponding with the fourth example.
Figure 13A:
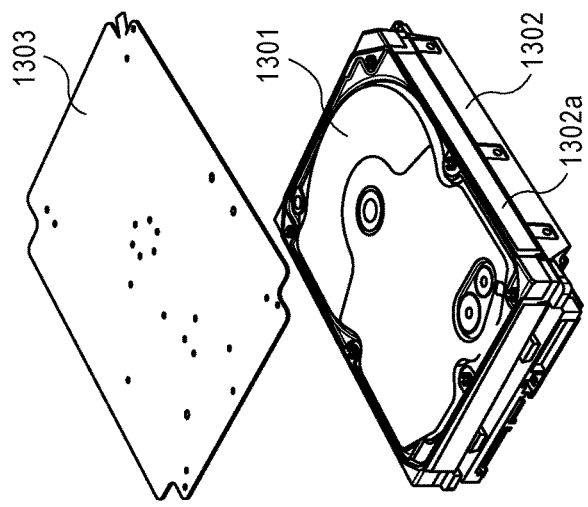
FIG. 13A is an exploded view illustrating a fourth example HDD adhesive seal configuration.

FIG. 12 is a flowchart illustrating a method for assembling a data storage device, according to a second embodiment. FIG. 12 is described with reference to FIGS. 13A-13C, where FIG. 13A is an exploded view illustrating a fourth example HDD adhesive seal configuration, FIG. 13B is a perspective view illustrating a step in the process associated with the fourth example, and FIG. 13C is a perspective view illustrating of an assembled HDD from the process associated with the fourth example, according to an embodiment.

At block 1202, a first cover is attached to an enclosure base having a plurality of sidewalls. For example, a conventional HDD cover may be attached to the base with fasteners and with a gasket seal therebetween, whereby servo-writing and manufacturing test may follow.

At block 1204, a flat metal sheet is positioned over the first cover, and at block 1206, the metal sheet is bent over the base to form a bent sheet metal cover comprising a plurality of sidewalls extending at an angle from a top portion such that each sidewall of the bent sheet metal cover overlaps at least in part with a corresponding sidewall of the base. For example, in FIGS. 13A, 13B a flat, rigid metal sheet 1303 is positioned over a first cover 1301 (block 1204) and aligned with the base 1302 using a fixture, for example. Then, the aligned metal sheet 1303 is bent (e.g., machine pressed) to form each sidewall 1304a extending at an angle from the top portion 1304b such that each sidewall 1304a overlaps with a corresponding sidewall 1302a of base 1302 (block 1206), as depicted in FIG. 13C. A fixture may be utilized to hold each sidewall 1304a at its edge to prevent spring-back. In this case, the bent sheet metal cover 1304 is a shape-in-place type of cover because the flat metal sheet 1303 is shaped and formed in place over the base 1302, effectively using the base 1302 as a mold.

At block 1208, a hermetic seal is formed between the bent sheet metal cover 1304 and the base 1302 by applying pressure to a pressure-sensitive adhesive (PSA). For example, and according to embodiments, with a PSA-attached cover seal the PSA material (not visible) may be fixed to the underside of portions of the original flat metal sheet 1303, or the PSA material may be fixed to top portions of the base 1304. PSA has relatively high permeability, therefore the adhesive layer thickness should be limited (e.g., ~25 μm). On the other hand, use of PSA can lead to a significantly narrower gap (e.g., ~25 μm) with less concern for tolerances because the seal thickness is set by the PSA film thickness rather than by parts tolerances.

An additional embodiment may include, prior to forming the hermetic seal, applying a PSA tape 1305 (shown dashed in FIG. 13C) overlapping a bottom edge portion of each sidewall 1304a of the bent sheet metal cover 1304 and a portion of the corresponding sidewall 1302a of the base 1302 adjacent the bottom edge portion of the cover. Use of thin foil with soft PSA material can ensure that the tape 1305 conforms to the base and cover, thereby absorbing manufacturing tolerances. A roller or press with elastic averaging can be used to apply the tape 1305 without entrapped bubbles. However, note that a tape seal has two leak paths (up and down) compared to just one for the case of a PSA-attached cover seal. Since two leak paths are present, each leak path should be designed for a half leak rate, implying that a tape seal should be 4 times wider in terms of seal area than a PSA-attached cover seal. Therefore, available height for a tape seal is a consideration.

Tub Cover Corner Configurations

Figure 14A:
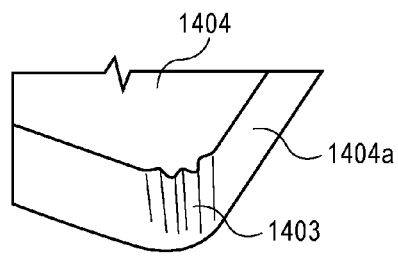
FIG. 14A is a perspective view illustrating a tub cover gathered corner, according to a first embodiment.
Figure 14B:
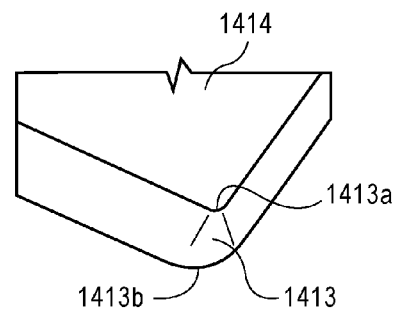
FIG. 14B is a perspective view illustrating a tub cover tapered radius corner, according to a second embodiment.

FIG. 14A is a perspective view illustrating a tub cover gathered corner, according to a first embodiment, and FIG. 14B is a perspective view illustrating a tub cover tapered radius corner, according to a second embodiment. With the gathered (or "pleated") corner of FIG. 14A, this type of tub cover corner has some extra material available by way of the pleat structural configuration. Thus, during an interference fit process each cover 1404 sidewall 1404a can deflect outward while pulling some extra material from each corner 1403, thus averting tearing of the cover material. However, the gathered material in the corners 1403 could result in thick epoxy areas and, consequently, a high leak rate in the corners 1403. Hence, according to an embodiment, corner horizontal seals may be used in such a scenario, such as illustrated and described in reference to FIG. 2.

Tub Cover with Tapered Radius Corners

With the tapered radius corner of FIG. 14B, according to an embodiment, a tub cover 1414 comprises tapered radius corners 1413, in which the corner radius 1413a is sharper (smaller) near the bottom edge of the tub cover 1414 (note that the corner 1413 is depicted in an upside down position) and the corner radius 1413b is larger near the top of the tub cover 1414.

Figure 15:
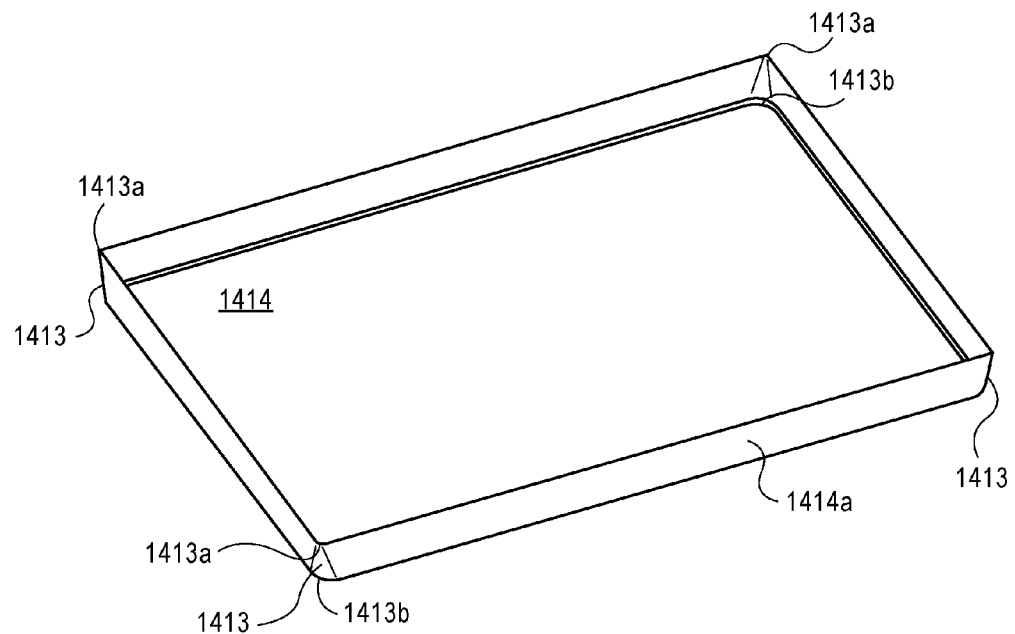
FIG. 15 is a bottom perspective view illustrating a tub cover having tapered radius corners, according to an embodiment.

FIG. 15 is a bottom perspective view illustrating a tub cover having tapered radius corners, according to an embodiment. Similarly to as illustrated in FIG. 14B, tub cover 1414 (again depicted in an upside down position) comprises tapered radius corners in which the bottom corner radius 1413a is smaller than the top corner radius 1413b. Some non-limiting example dimensions are as follows, where the cover 1414 is dimensioned for a 95 mm form factor HDD, and comprises long sides at about 146 mm and short sides at about 101 mm. The cover 1414 thickness may be about 0.25 mm, with the material being aluminum, for example. Further with this example, the bottom corner radius 1413a is approximately 1 mm and the top corner radius 1413b is approximately 4.75 mm. In between the bottom corner radius 1413a and the top corner radius 1413b, the radius gradually changes from 1 mm to 4.75 mm, which is referred to as a tapered radius (or "lofted") shape. Still further with this example, the sidewalls 1414a of cover 1414 is vertical in its as-formed state (i.e., prior to installing onto a base, such as base 1602 of FIGS. 16A, 16B).

Base for Tub Cover with Tapered Radius Corners

Figure 16A:
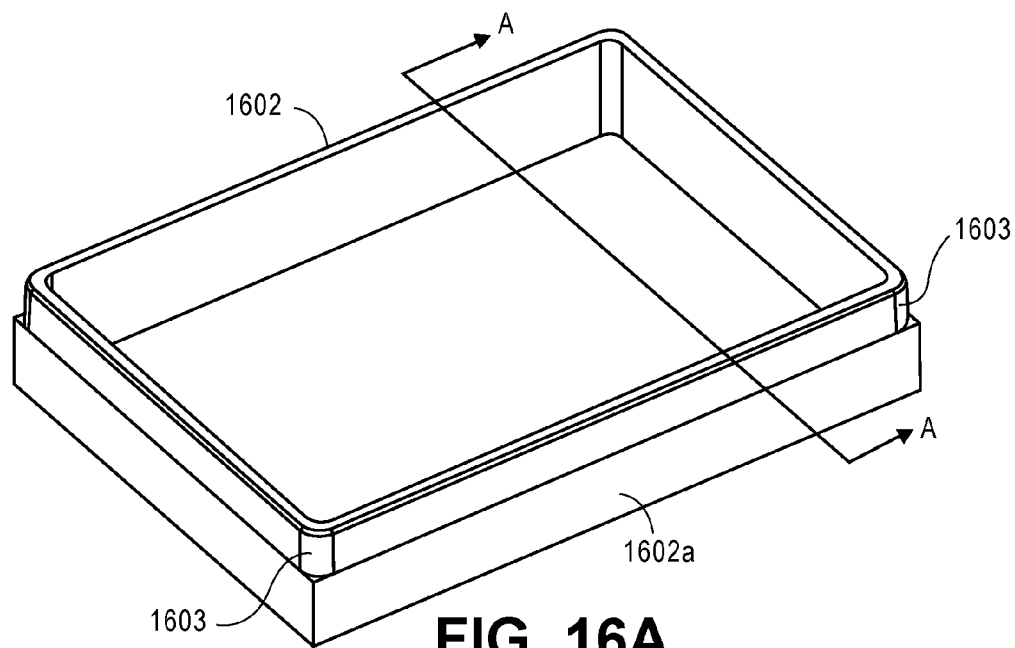
FIG. 16A is a top perspective view illustrating an HDD base.
Figure 16B:
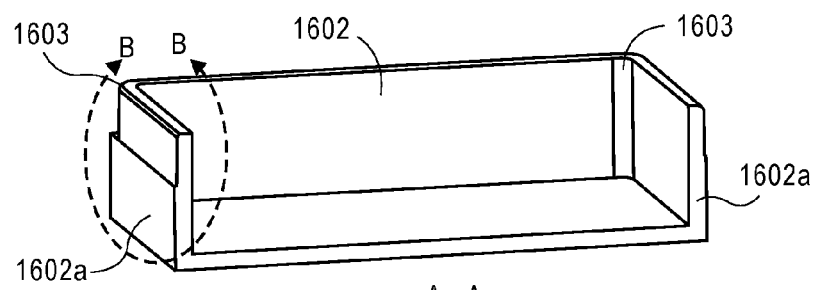
FIG. 16B is a cross-sectional perspective view illustrating the base of 16A.
Figure 16C:
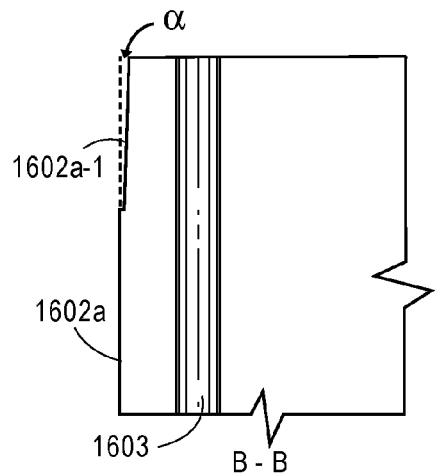
FIG. 16C is a cross-sectional view illustrating a sidewall of the base of 16A, according to an embodiment.

FIG. 16A is a top perspective view illustrating an HDD base; FIG. 16B is a cross-sectional perspective view illustrating the base of 16A; and FIG. 16C is a cross-sectional view illustrating a sidewall of the base of 16A, according to an embodiment. In FIG. 16A, base 1602 comprises corners 1603 having a constant corner radius matching the top corner radius 1413b of a corresponding cover, such as cover 1414 (FIGS. 14B, 15). For a non-limiting example, the radius of corners 1603 are a constant 4.75 mm over the entire height of each sidewall 1602a that will be overlapped by the sidewalls of the cover, such as sidewalls 1414a of cover 1414. With reference to FIG. 16C, note that the top portion 1602a-1 of the outer surface of the sidewall 1602a is not vertical, but is depicted as sloped at an angle α (e.g., approximately 1.7 degrees for this example). Both the cover 1414 sidewalls 1414a and the base 1602 sidewalls 1602a may be sloped, according to an embodiment. However, the base 1602 preferably has more slope than the cover 1414 so that there is interference between the cover sidewalls 1414a and base sidewalls 1602a as the cover 1414 is pushed down onto the sidewalls 1602a of the base 1602.

Figure 17A:
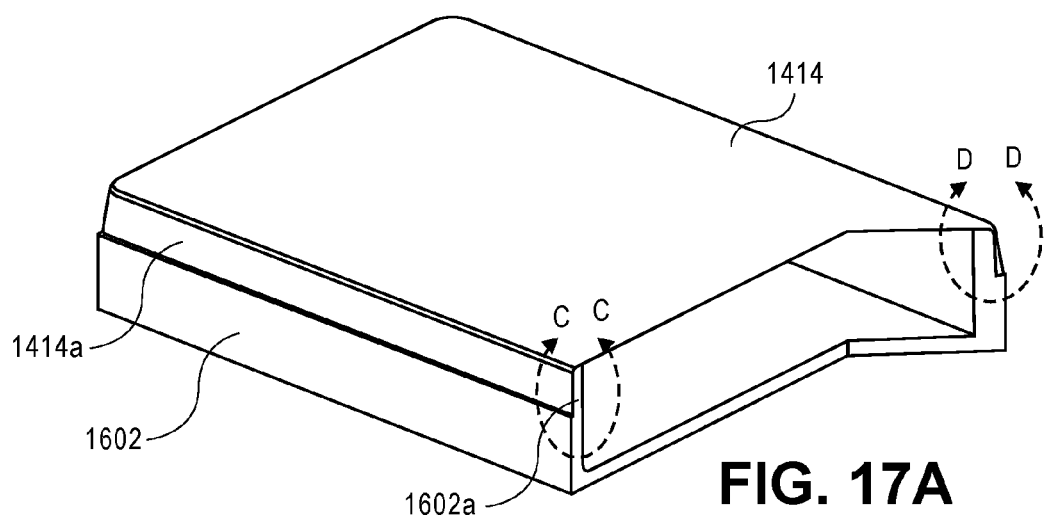
FIG. 17A is a top perspective view illustrating an HDD assembly having a tub cover assembled to a base.
Figure 17B:
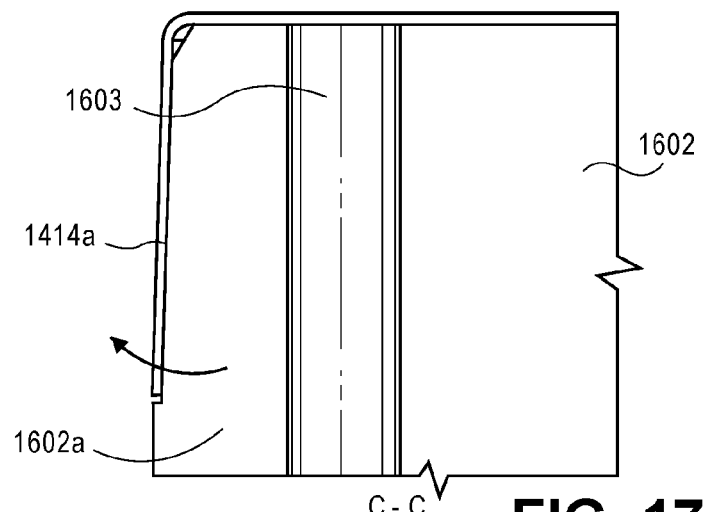
FIG. 17B is a cross-sectional side view illustrating mating sidewalls of the assembly of 17A.
Figure 17C:
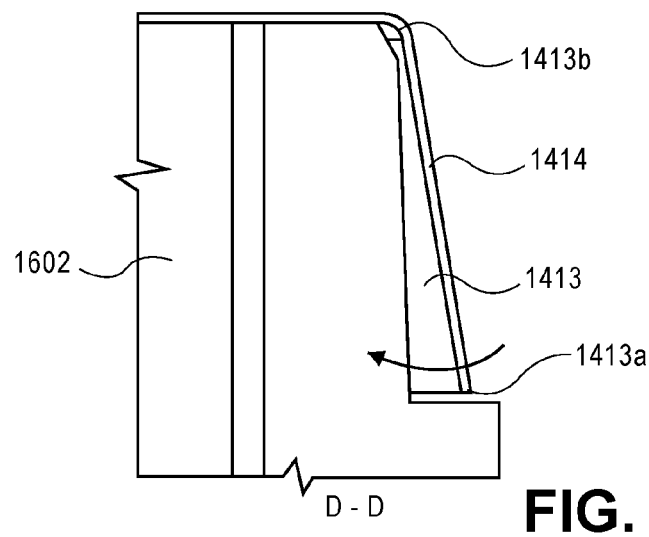
FIG. 17C is a cross-sectional side view illustrating a corner area of the assembly of 17A, illustrating a portion of an assembly process, according to an embodiment.

FIG. 17A is a top perspective view illustrating an HDD assembly having a tub cover assembled to a base; FIG. 17B is a cross-sectional side view illustrating mating sidewalls of the assembly of 17A; and FIG. 17C is a cross-sectional side view illustrating a corner area of the assembly of 17A, illustrating a portion of an assembly process, according to an embodiment. FIGS. 17A-17C illustrates the HDD assembly after the cover 1414 has been pushed down over the sidewalls 1602a of the base 1602.

According to an embodiment, at the top of the base 1602 sidewall 1602a, the width of the cover 1414 matches the width of the base 1602 (to within close tolerances), and there is no intentional interference created between the two parts. However, further down the sidewall 1602a, because there is a difference in slopes between the cover 1414 sidewall 1414a (vertical, in the embodiment depicted) and the base 1602 sidewall 1602a (depicted as 1.7 degrees off vertical), there is interference, as depicted in FIG. 17B. This interference, generally between the bottom edge of the sidewall 1414a and the bottom portion of the sloped portion of the sidewall 1602a (see, e.g., angle α of FIG. 16C), forces the sidewalls 1414a of the cover 1414 outward (i.e., the cover is thin and relatively weak, while the base is thick and relatively strong), thereby causing or resulting in an inward force exerted by the sidewalls 1414a against the sidewalls 1602a of the base 1602. Hence, the hermetic seal formed between the cover 1414 and the base 1602 is based on this inward force, since the epoxy seal is applied between the two respective sidewalls 1414a, 1602a and the inward force compresses the liquid epoxy to form a very thin (and thus hermetic) adhesive bond.

However, as the sidewalls 1414a of the cover 1414 are forced outward by the slope on the sidewalls 1602a of the base 1602, "extra" material is needed to provide for this apparent increase in perimeter. Such "extra" material is effectively available in the corners 1413 of the cover 1414, because of the tapered radius (1413a relative to 1413b) of the corners 1413a. That is, if the cover had a constant corner radius (e.g., 4.75 mm), the cover corners would fit tightly over the base corner radius (e.g., 4.75 mm). However, since the corner radius 1413 of the cover 1414 gradually decreases (for a non-limiting example, from a top radius 1413b of 4.75 mm at the top of the cover corner 1413 to a bottom radius 1413a of 1 mm at the bottom of the cover corner 1413), there is some extra material in the corners 1413. Thus, as the cover 1414 sidewalls 1414a are pushed outward (as depicted by the arrow in FIG. 17B) by pushing the cover 1414 onto the sloped base 1602 sidewalls 1602a, the extra material in the cover corners 1413 is pulled inward (as depicted by the arrow in FIG. 17C) and toward the sidewalls 1602a. This provision of extra material in the corners 1413 of the tub cover 1414 provides for lower stresses and avoids tearing of the cover 1414 material at the corners 1413.

If fabrication tolerances are well controlled, the final state of the installed cover 1414 should have the cover sidewalls 1414a biased against the base 1602, with minimal excess material remaining in the corners 1413. Such corners 1413 may not necessarily form a very narrow bond line, so the leak rate in the corners 1413 could be higher than along the sidewalls 1414a. However, since the corners 1413 only occupy a small fraction of the total perimeter seal, a somewhat higher leak rate per unit length at the corners 1413 can be tolerated while keeping the entire cover seal within a specified leak budget.

Method of Assembling a Data Storage Device with a Tub Cover and Perimeter Adhesive Seal With HDD configurations in which a tub cover is used (e.g., in lieu of a bent metal sheet cover), a similar process to the process described in reference to FIG. 11 may be used to assemble a tub cover-based hermetically-sealed HDD. Therefore, reference is made to FIG. 11 for one approach to assembling a tub cover with an HDD base, according to an embodiment, where the use of a tub cover is substituted for a bent metal sheet cover.

Figure 18:
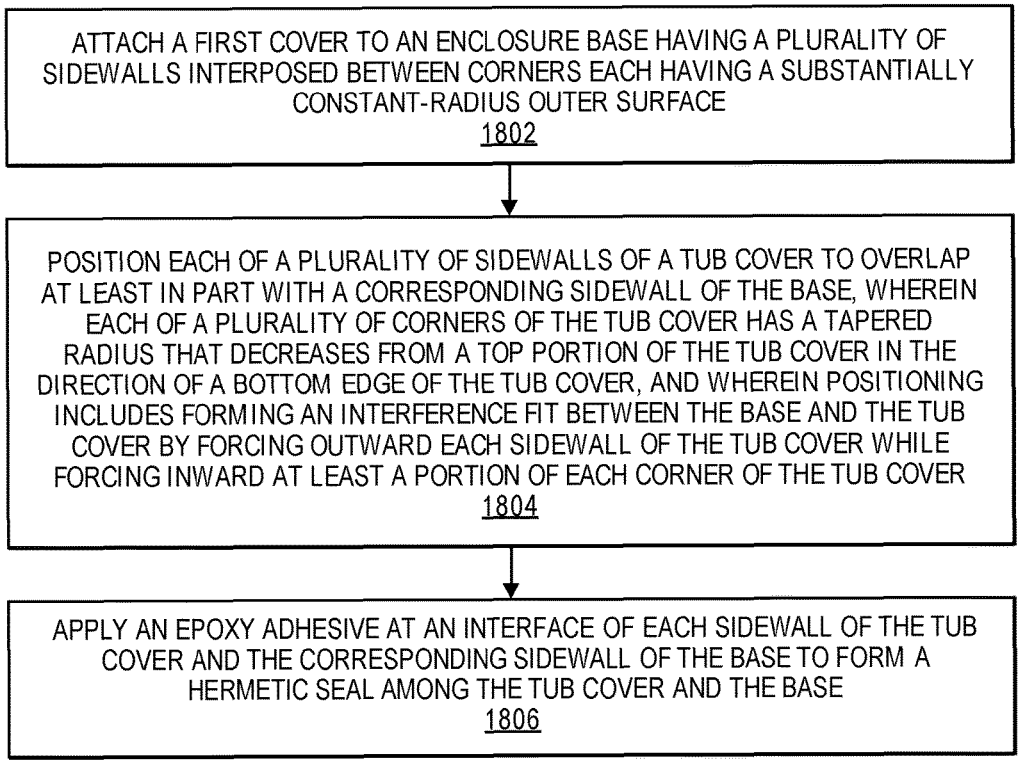
FIG. 18 is a flow diagram illustrating a method of assembling a data storage device, according to an embodiment.

FIG. 18 is a flow diagram illustrating a method of assembling a data storage device, according to an embodiment.

At block 1802, a first cover is attached to an enclosure base having a plurality of sidewalls interposed between corners each having a substantially constant-radius outer surface. For example, a conventional HDD cover may be attached to a base 1602 with fasteners and with a gasket seal therebetween, where the base 1602 comprises constant-radius corners, and whereby servo-writing and manufacturing test may follow.

At block 1804, each of a plurality of sidewalls of a tub cover is positioned to overlap at least in part with a corresponding sidewall of the base, wherein each of a plurality of corners of the tub cover has a tapered radius that decreases from a top portion of the tub cover in the direction of the bottom edge of the tub cover. Further, the positioning includes forming an interference fit between the base and the tub cover at areas where the corners of the base and tub cover mate, by forcing outward each sidewall of the tub cover while forcing inward at least a portion of each corner of the tub cover. For example, each sidewall 1414a (FIGS. 15, 17) of the cover 1414 (FIGS. 15, 17) is positioned to overlap with a portion of a corresponding sidewall 1602a (FIGS. 16A-C, 17) of the base 1602 (FIGS. 16A, 16B, 17), where each corner 1413 (FIGS. 14B, 15, 17) of the cover 1414 has a tapered radius, such as described and illustrated by bottom corner radius 1413a (FIGS. 14B, 15, 17) and top corner radius 1413b (FIGS. 14B, 15, 17). Further, with the positioning of block 1804, an interference fit is formed between the base 1602 and the tub cover 1414, by forcing outward each sidewall 1414a of the tub cover (e.g., arrow of FIG. 17B) while forcing inward at least a portion of each corner 1413 of the tub cover (e.g., arrow of FIG. 17C). With suitable flexibility associated with the tub cover, the inward deflection of the corners may occur simply as a result of the outward deflection of the sidewalls caused by the interference between the parts during assembly.

At block 1806, an epoxy adhesive is applied at an interface of each sidewall of the tub cover and each corresponding sidewall of the base to form a hermetic seal between (or among) the tub cover and the base. For example, an epoxy adhesive is applied between each sidewall 1414a (FIGS. 15, 17) of the cover 1414 (FIGS. 15, 17) and each corresponding sidewall 1602a (FIGS. 16A-C, 17) of the base 1602 (FIGS. 16A, 16B, 17) to form a hermetic seal between the tub cover 1414 and the base 1602. As described in reference to FIGS. 5A, 5B, a liquid epoxy adhesive may be applied, for example, either all along the periphery or at injection points, whereby the dispensed epoxy is automatically drawn into the seal using capillary action, after assembly and prior to curing at an elevated temperature. Furthermore, as described in reference to the tub cover 904 of FIG. 9A, the epoxy adhesive may be dispensed, for example, as a continuous bead around the complete inside perimeter of the sidewall 1414a of the tub cover 1414, or the outside perimeter sidewall 1602a of the base 1602, or both, prior to assembly. Still further, an epoxy adhesive could be applied at or near where the bottom edge of the sidewall 1414a of the tub cover 1414 meets with the base 1602, rather than precisely "between" the two parts.

Note that the adhesive sealant does not have to be epoxy, as other polymeric adhesives may be used. Furthermore, a heat-sealing material may be used by applying the material to one of the mating parts, and then heating the cover and base assembly after assembly to reflow the heat-seal material. Soldering may also be an option.

Method of Assembling a Data Storage Device with Perimeter Adhesive Seal

Figure 19:
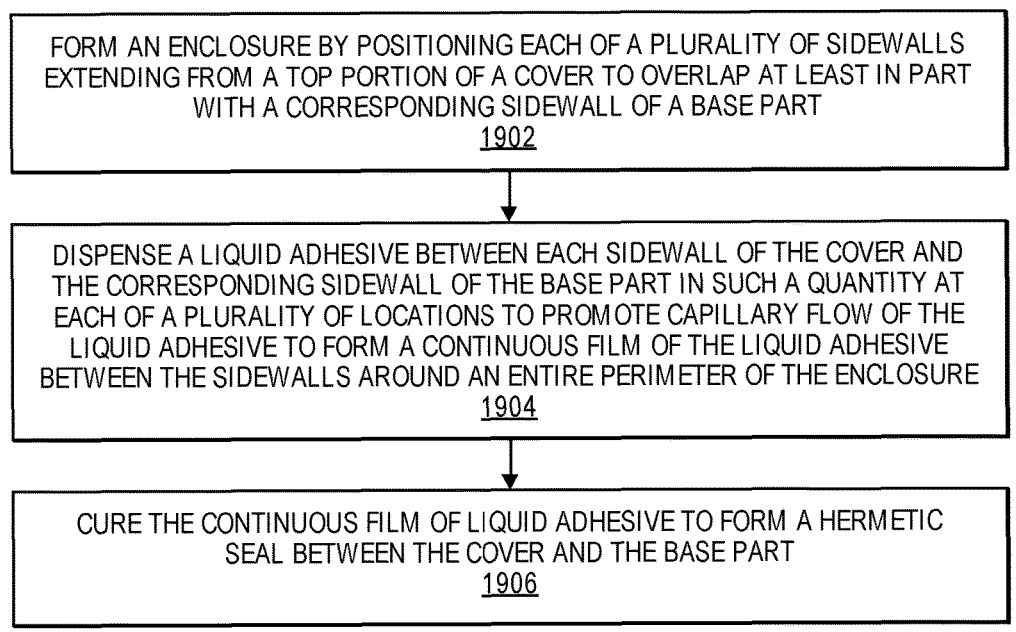
FIG. 19 is a flow diagram illustrating a method of assembling a data storage device, according to an embodiment.

FIG. 19 is a flow diagram illustrating a method of assembling a data storage device, according to an embodiment.

At block 1902, an enclosure is formed by positioning each of a plurality of sidewalls extending from a top portion of a cover to overlap at least in part with a corresponding sidewall of a base part. For example, form an enclosure by positioning the sidewalls of the cover 604 (FIG. 6C) to overlap with the sidewalls of the base 602 (FIGS. 6B, 6C).

At block 1904, a liquid adhesive is dispensed between each sidewall of the cover and the corresponding sidewall of the base part, in such a quantity at each of a plurality of locations, to promote capillary flow of the liquid adhesive to form a continuous film of the liquid adhesive between the sidewalls around the entire perimeter of the enclosure. For example, a liquid adhesive (e.g., a liquid epoxy) is dispensed between the respective sidewalls of the cover 604 and the base 602, via the plurality of filling features 606 (FIGS. 6A-8), in a manner suitable for promoting the desired capillary flow in order to form the desired continuous film of liquid adhesive (e.g., between the sidewalls of the cover 604 and the base 602 around the entire perimeter of the HDD assembly 600 (FIG. 6C). Recall that an adhesive seal/bond line thickness of around 0.1 mm and a width (or height) of around 5-10 mm or more is considered suitable.

In this context, a "substantially" continuous film of liquid adhesive may be sufficient, where minute discontinuities in the adhesive could be present while the effectiveness of the seal still falls within the desired leak budget.

At block 1906, the continuous film of liquid adhesive is cured, to form a hermetic seal between the cover and the base part. According to embodiments, the surface treatment and gap control techniques described elsewhere herein, for example, may be applied to this assembly method for enhancing the capillary flow and controlling the seal thickness (i.e., by controlling the gap), respectively.

EXTENSIONS AND ALTERNATIVES

Implementation and use of embodiments described herein are not limited solely to individual HDDs. Rather, embodiments involving the use of particular cover and base configurations/geometries to provide a sufficiently low-permeable cover-to-base perimeter seal, may also be applied to a system level sealed tray or box of multiple HDDs enclosed in a box containing gas like He or $N_2$, as well as to hermetically-sealed electronic devices, generally (e.g., optical systems, optical data storage devices, and the like).

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A method of assembling a data storage device, the method comprising:
    forming an enclosure by positioning each of a plurality of sidewalls extending from a top portion of a cover to overlap at least in part with a corresponding sidewall of a base part, including setting a gap between each inner surface of said sidewall of said cover and said corresponding sidewall of said base part based on a plurality of protrusions extending outward from an outermost surface of each said sidewall of said base part;
    dispensing a liquid adhesive between each said sidewall of said cover and said corresponding sidewall of said base part at each of a plurality of locations to promote capillary flow of said liquid adhesive to form a continuous film of said liquid adhesive between said sidewalls around an entire perimeter of said enclosure; and
    curing said continuous film of liquid adhesive to form a hermetic seal between said cover and said base part.

2. The method of claim 1, further comprising:
    prior to dispensing said liquid adhesive, treating at least one inner surface of said cover or one outer surface of said base part using one or more surface treatment techniques from a group consisting of abrasive blasting, feature forming, and cut feature forming.

3. The method of claim 1, further comprising:
    prior to curing said continuous film of liquid adhesive, inspecting said adhesive through one or more inspection holes through each said sidewall of said cover.

4. The method of claim 1, wherein dispensing said liquid adhesive includes dispensing a liquid epoxy.

5. The method of claim 1, wherein said base part comprises a plurality of adhesive filling slots spaced around its perimeter and that extend from outside of an area in which respective said sidewalls overlap to said area of overlap, and wherein dispensing said liquid adhesive includes dispensing a liquid epoxy via said plurality of adhesive filling slots.

6. The method of claim 1, wherein said cover is a tub cover.

7. The method of claim 1, wherein said cover is a pre-formed bent sheet metal cover.

8. The method of claim 1, wherein said cover is a shape-in-place bent sheet metal cover.

9. The method of claim 1, further comprising:
    prior to forming said enclosure,
        attaching a first cover to said base part to form a non-hermetically-sealed enclosure; and
        filling said non-hermetically-sealed enclosure with a lighter-than-air gas.

10. A method of assembling a data storage device, the method comprising:
    forming an enclosure by positioning each of a plurality of sidewalls extending from a top portion of a cover to overlap at least in part with a corresponding sidewall of a base part;
    dispensing a liquid adhesive between each said sidewall of said cover and said corresponding sidewall of said base part at each of a plurality of locations to promote capillary flow of said liquid adhesive to form a continuous film of said liquid adhesive between said sidewalls around an entire perimeter of said enclosure; and
    curing said continuous film of liquid adhesive to form a hermetic seal between said cover and said base part;
    wherein each said sidewall of said cover is outwardly sloped at a first angle, and wherein each said sidewall of said base part comprises an upper portion that is inwardly sloped at a second angle, and wherein said first angle is less than said second angle, and wherein forming said enclosure includes creating interference between a bottom edge of said cover and a bottom portion of said upper portion of said base part.

11. The method of claim 10, further comprising:
prior to dispensing said liquid adhesive, treating at least one inner surface of said cover or one outer surface of said base part using one or more surface treatment techniques from a group consisting of abrasive blasting, feature forming, and cut feature forming.

12. The method of claim 10, further comprising:
prior to curing said continuous film of liquid adhesive, inspecting said adhesive through one or more inspection holes through each said sidewall of said cover.

13. The method of claim 10, wherein dispensing said liquid adhesive includes dispensing a liquid epoxy.

14. The method of claim 10, wherein said base part comprises a plurality of adhesive filling slots spaced around its perimeter, and wherein dispensing said liquid adhesive includes dispensing a liquid epoxy via said plurality of adhesive filling slots.

15. The method of claim 10, further comprising:
prior to forming said enclosure,
attaching a first cover to said base part to form a non-hermetically-sealed enclosure; and
filling said non-hermetically-sealed enclosure with a lighter-than-air gas.

16. A method of assembling a data storage device, the method comprising:
forming an enclosure by positioning each of a plurality of sidewalls extending from a top portion of a cover to overlap at least in part with a corresponding sidewall of a base part, including setting a gap between each inner surface of said sidewall of said cover and said corresponding sidewall of said base part based on a plurality of dimples extending inward from said inner surface of each said sidewall of said cover;
dispensing a liquid adhesive between each said sidewall of said cover and said corresponding sidewall of said base part at each of a plurality of locations to promote capillary flow of said liquid adhesive to form a continuous film of said liquid adhesive between said sidewalls around an entire perimeter of said enclosure; and
curing said continuous film of liquid adhesive to form a hermetic seal between said cover and said base part.

17. The method of claim 16, further comprising:
prior to dispensing said liquid adhesive, treating at least one inner surface of said cover or one outer surface of said base part using one or more surface treatment techniques from a group consisting of abrasive blasting, feature forming, and cut feature forming.

18. The method of claim 16, further comprising:
prior to curing said continuous film of liquid adhesive, inspecting said adhesive through one or more inspection holes through each said sidewall of said cover.

19. The method of claim 16, wherein dispensing said liquid adhesive includes dispensing a liquid epoxy.

20. The method of claim 16, wherein said base part comprises a plurality of adhesive filling slots spaced around its perimeter and that extend from outside of an area in which respective said sidewalls overlap to said area of overlap, and wherein dispensing said liquid adhesive includes dispensing a liquid epoxy via said plurality of adhesive filling slots.

21. The method of claim 16, wherein said cover is a pre-formed bent sheet metal cover.

22. The method of claim 16, wherein said cover is a shape-in-place bent sheet metal cover.

23. The method of claim 16, further comprising:
prior to forming said enclosure,
attaching a first cover to said base part to form a non-hermetically-sealed enclosure; and
filling said non-hermetically-sealed enclosure with a lighter-than-air gas.

* * * * *